(12) United States Patent
Meirav et al.

(10) Patent No.: US 11,541,346 B2
(45) Date of Patent: *Jan. 3, 2023

(54) EFFICIENT USE OF ADSORBENTS FOR INDOOR AIR SCRUBBING

(71) Applicant: enVerid Systems, Inc., Westwood, MA (US)

(72) Inventors: Udi Meirav, Newton, MA (US); Israel Biran, Avihayil (IL)

(73) Assignee: ENVERID SYSTEMS, INC., Westwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,613

(22) Filed: Jan. 6, 2020

(65) Prior Publication Data

US 2020/0139294 A1 May 7, 2020

Related U.S. Application Data

(60) Division of application No. 15/430,359, filed on Feb. 10, 2017, now Pat. No. 10,525,401, which is a
(Continued)

(51) Int. Cl.
*B01D 53/04* (2006.01)
*B01D 53/34* (2006.01)
(Continued)

(52) U.S. Cl.
CPC ..... *B01D 53/0454* (2013.01); *B01D 53/0407* (2013.01); *B01D 53/0446* (2013.01);
(Continued)

(58) Field of Classification Search
CPC .............. B01D 53/04; B01D 53/0407; B01D 53/0446; B01D 53/0454; B01D 53/346;
(Continued)

(56) References Cited

U.S. PATENT DOCUMENTS 1,522,480 A 1/1925 Allen
1,836,301 A 12/1931 Bechthold
(Continued)

FOREIGN PATENT DOCUMENTS

CA 2 640 152 A1 4/2010
CN 2141873 Y 9/1993
(Continued)

OTHER PUBLICATIONS

Chinese Application No. 201810059771.6: English translation of First Notification of Office Action, dated Jul. 1, 2020, 9 pages.
(Continued)

*Primary Examiner* — Frank M Lawrence, Jr.
(74) *Attorney, Agent, or Firm* — Cooley LLP

(57) ABSTRACT

Some embodiments of the disclosure correspond to, for example, a method for controlling a scrubber containing an adsorbent. The scrubber may be configured to cycle between scrubbing at least one pollutant/gas from a stream of gases with the pollutant/gas being adsorbed onto the adsorbent, and regenerating at least some of the adsorbent and thereby purging at least some of the one pollutant and/or first gas from the adsorbent via a regeneration gas flow. The method may include flowing a stream of gases through the scrubber, the scrubber including the adsorbent and adsorbing at least some of the one pollutant/gas from the stream of gases onto the adsorbent during an adsorption phase over a first time period. The method may also include purging at least a portion of the one pollutant/gas from the adsorbent during a regeneration phase over a second time period with a regeneration gas flow, and cycling therebetween.

14 Claims, 7 Drawing Sheets

Related U.S. Application Data continuation of application No. 14/403,562, filed as application No. PCT/US2013/042239 on May 22, 2013, now Pat. No. 9,566,545.

(60) Provisional application No. 61/704,796, filed on Sep. 24, 2012, provisional application No. 61/664,748, filed on Jun. 27, 2012, provisional application No. 61/664,168, filed on Jun. 26, 2012, provisional application No. 61/650,204, filed on May 22, 2012.

(51) Int. Cl.
 B01D 53/82 (2006.01)
 B01D 53/96 (2006.01)

(52) U.S. Cl.
 CPC ........... *B01D 53/346* (2013.01); *B01D 53/82* (2013.01); *B01D 53/96* (2013.01); *B01D 2252/204* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/116* (2013.01); *B01D 2253/1124* (2013.01); *B01D 2253/20* (2013.01); *B01D 2253/202* (2013.01); *B01D 2253/204* (2013.01); *B01D 2253/25* (2013.01); *B01D 2255/20707* (2013.01); *B01D 2257/11* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2258/0283* (2013.01); *B01D 2258/06* (2013.01); *B01D 2259/4145* (2013.01); *B01D 2259/4508* (2013.01); *Y02C 20/10* (2013.01); *Y02C 20/40* (2020.08)

(58) Field of Classification Search
 CPC .. B01D 53/82; B01D 53/96; B01D 2253/204; B01D 2253/102; B01D 2253/104; B01D 2253/106; B01D 2253/108; B01D 2253/11; B01D 2253/1124; B01D 2253/116; B01D 2253/20; B01D 2253/202; B01D 2253/25; B01D 2255/20707; B01D 2257/11; B01D 2257/302; B01D 2257/404; B01D 2257/502; B01D 2257/708; B01D 2258/0283; B01D 2258/06; B01D 2259/4145; B01D 2259/4508; Y02C 10/08; Y02C 20/10; Y02C 20/40
 See application file for complete search history.

(56) References Cited

U.S. PATENT DOCUMENTS

| | | |
|---|---|---|
| 2,633,928 A | 4/1953 | Chamberlain |
| 3,042,497 A | 7/1962 | Johnson et al. |
| 3,107,641 A | 10/1963 | Haynes |
| 3,344,050 A | 9/1967 | Mayland et al. |
| 3,511,595 A | 5/1970 | Fuchs |
| 3,594,983 A | 7/1971 | Yearout |
| 3,619,130 A | 11/1971 | Ventriglio et al. |
| 3,702,049 A | 11/1972 | Morris, Jr. |
| 3,751,848 A | 8/1973 | Ahlstrand |
| 3,751,878 A | 8/1973 | Collins |
| 3,795,090 A | 3/1974 | Barnebey |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sirkar et al. |
| 4,292,059 A | 9/1981 | Kovach |
| 4,322,394 A | 3/1982 | Mezey et al. |
| 4,325,921 A | 4/1982 | Aiken et al. |
| 4,409,006 A | 10/1983 | Mattia |
| 4,433,981 A | 2/1984 | Slaugh et al. |
| 4,451,435 A | 5/1984 | Hölter et al. |
| 4,472,178 A | 9/1984 | Kumar et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar et al. |
| 4,810,266 A | 3/1989 | Zinnen et al. |
| 4,816,043 A | 3/1989 | Harrison |
| 4,863,494 A | 9/1989 | Hayes |
| 4,892,719 A | 1/1990 | Gesser |
| 4,917,862 A | 4/1990 | Kraw et al. |
| 4,976,749 A | 12/1990 | Adamski et al. |
| 4,987,952 A | 1/1991 | Beal et al. |
| 5,046,319 A | 9/1991 | Jones |
| 5,087,597 A | 2/1992 | Leal et al. |
| 5,109,916 A | 5/1992 | Thompson |
| 5,137,548 A | 8/1992 | Grenier et al. |
| 5,149,343 A | 9/1992 | Sowinski |
| 5,186,903 A | 2/1993 | Cornwell |
| 5,194,158 A | 3/1993 | Matson |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,443,625 A | 8/1995 | Schaffhausen |
| 5,464,369 A | 11/1995 | Federspiel |
| 5,471,852 A | 12/1995 | Meckler |
| 5,492,683 A | 2/1996 | Birbara et al. |
| 5,584,916 A | 12/1996 | Yamashita et al. |
| 5,614,000 A | 3/1997 | Kalbassi et al. |
| 5,646,304 A | 7/1997 | Acharya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson |
| 5,869,323 A | 2/1999 | Horn |
| 5,876,488 A * | 3/1999 | Birbara .............. B01J 20/28078 96/111 |
| 5,904,896 A | 5/1999 | High |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bülow et al. |
| 6,027,550 A | 2/2000 | Vickery |
| 6,102,793 A | 8/2000 | Hansen |
| 6,113,674 A | 9/2000 | Graham et al. |
| 6,120,581 A | 9/2000 | Markovs et al. |
| 6,123,617 A | 9/2000 | Johnson |
| 6,187,596 B1 | 2/2001 | Dallas et al. |
| 6,254,763 B1 | 7/2001 | Izumi et al. |
| 6,280,691 B1 | 8/2001 | Homeyer et al. |
| 6,364,938 B1 | 4/2002 | Birbara et al. |
| 6,375,722 B1 * | 4/2002 | Henderson ......... B01D 53/0454 96/112 |
| 6,402,809 B1 | 6/2002 | Monereau et al. |
| 6,425,937 B1 | 7/2002 | Kraus et al. |
| 6,428,608 B1 | 8/2002 | Shah et al. |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Dipak et al. |
| 6,711,470 B1 | 3/2004 | Hartenstein et al. |
| 6,726,558 B1 | 4/2004 | Meirav |

(56) References Cited

U.S. PATENT DOCUMENTS

| | | |
|---|---|---|
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,210,914 B2 | 7/2012 | McMahan et al. |
| 8,317,890 B2 | 11/2012 | Raether et al. |
| 8,398,753 B2 | 3/2013 | Sergi et al. |
| 8,491,710 B2 | 7/2013 | Meirav |
| 8,690,999 B2 | 4/2014 | Meirav et al. |
| 8,734,571 B2 | 5/2014 | Golden et al. |
| 9,316,410 B2 | 4/2016 | Meirav et al. |
| 9,328,936 B2 | 5/2016 | Meirav et al. |
| 9,399,187 B2 | 7/2016 | Meirav et al. |
| 9,566,545 B2 * | 2/2017 | Meirav .................. B01D 53/82 |
| 9,802,148 B2 | 10/2017 | Meirav et al. |
| 9,919,257 B2 | 3/2018 | Meirav et al. |
| 9,939,163 B2 | 4/2018 | Meirav et al. |
| 9,950,290 B2 | 4/2018 | Meirav et al. |
| 9,976,760 B2 | 5/2018 | Meirav et al. |
| 9,987,584 B2 | 6/2018 | Meirav et al. |
| 10,046,266 B2 | 8/2018 | Meirav et al. |
| 10,086,324 B2 | 10/2018 | Meirav |
| 10,281,168 B2 | 5/2019 | Meirav et al. |
| 10,525,401 B2 * | 1/2020 | Meirav .............. B01D 53/0454 |
| 10,675,582 B2 | 6/2020 | Meirav et al. |
| 10,730,003 B2 | 8/2020 | Meirav |
| 10,765,990 B2 | 9/2020 | Meirav et al. |
| 10,792,608 B2 | 10/2020 | Meirav et al. |
| 10,850,224 B2 | 12/2020 | Meirav et al. |
| 10,913,026 B2 | 2/2021 | Meirav et al. |
| 11,207,633 B2 | 12/2021 | Meirav et al. |
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 * | 7/2002 | Nalette .................. B01J 20/26 95/139 |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0037672 A1 | 2/2003 | Sircar |
| 2003/0041733 A1 | 3/2003 | Sequin et al. |
| 2003/0097086 A1 | 5/2003 | Gura |
| 2003/0188745 A1 | 10/2003 | Deas et al. |
| 2004/0005252 A1 | 1/2004 | Siess |
| 2004/0020361 A1 | 2/2004 | Pellegrin |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0147530 A1 | 7/2005 | Kang et al. |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2005/0288512 A1 | 12/2005 | Butters et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0112708 A1 | 6/2006 | Reaves |
| 2006/0148642 A1 | 7/2006 | Ryu et al. |
| 2006/0225569 A1 | 10/2006 | Schmidt et al. |
| 2006/0236867 A1 | 10/2006 | Neary |
| 2006/0249019 A1 | 11/2006 | Roychoudhury et al. |
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0173035 A1 | 7/2008 | Thayer et al. |
| 2008/0182506 A1 | 7/2008 | Jackson et al. |
| 2008/0210768 A1 | 9/2008 | You |
| 2008/0216653 A1 | 9/2008 | Paton-Ash et al. |
| 2008/0293976 A1 | 11/2008 | Olah et al. |
| 2009/0000621 A1 | 1/2009 | Haggblom et al. |
| 2009/0044704 A1 | 2/2009 | Shen et al. |
| 2009/0071062 A1 | 3/2009 | Hedman |
| 2009/0120288 A1 | 5/2009 | Lackner et al. |
| 2009/0188985 A1 | 7/2009 | Scharing et al. |
| 2009/0214902 A1 | 8/2009 | Pelman |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 * | 6/2010 | Liu .......................... B01J 20/08 95/139 |
| 2010/0224565 A1 | 9/2010 | Dunne et al. |
| 2010/0251887 A1 * | 10/2010 | Jain .................... B01D 53/0462 95/46 |
| 2010/0254868 A1 | 10/2010 | Obee et al. |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0160099 A1 * | 6/2012 | Shoji ........................ B63G 8/36 95/139 |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0271460 A1 | 10/2012 | Rognili |
| 2012/0272966 A1 | 11/2012 | Ando et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2013/0291732 A1 | 11/2013 | Meirav |
| 2013/0331021 A1 | 12/2013 | Rodell |
| 2014/0013956 A1 | 1/2014 | Ericson et al. |
| 2014/0105809 A1 * | 4/2014 | Okumura ............... B01D 53/04 423/437.1 |
| 2014/0242708 A1 | 8/2014 | Lundgren |
| 2014/0298996 A1 | 10/2014 | Meirav et al. |
| 2015/0078964 A1 | 3/2015 | Meirav et al. |
| 2015/0297771 A1 | 10/2015 | Law et al. |
| 2016/0228811 A1 | 8/2016 | Meirav et al. |
| 2016/0363333 A1 | 12/2016 | Meirav et al. |
| 2017/0227241 A1 | 8/2017 | Claesson et al. |
| 2018/0147526 A1 | 5/2018 | Meirav et al. |
| 2018/0187907 A1 | 7/2018 | Meirav et al. |
| 2018/0236396 A1 | 8/2018 | Meirav et al. |
| 2018/0264396 A1 | 9/2018 | Meirav et al. |

(56) References Cited

U.S. PATENT DOCUMENTS

| | | |
|---|---|---|
| 2018/0339261 A1 | 11/2018 | Meirav et al. |
| 2018/0339262 A1 | 11/2018 | Perl-Olshvang et al. |
| 2019/0143258 A1 | 5/2019 | Meirav et al. |
| 2019/0186762 A1 | 6/2019 | Meirav et al. |
| 2019/0247782 A1 | 8/2019 | Meirav et al. |
| 2019/0262761 A1 | 8/2019 | Meirav |
| 2019/0299154 A1 | 10/2019 | Meirav et al. |
| 2019/0344211 A1 | 11/2019 | Meirav et al. |
| 2019/0346161 A1 | 11/2019 | Meirav et al. |
| 2020/0166235 A1 | 5/2020 | Marra et al. |
| 2021/0140655 A1 | 5/2021 | Meirav et al. |
| 2021/0283545 A1 | 9/2021 | Meirav et al. |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 200993448 Y | 12/2007 |
| CN | 101199913 A | 6/2008 |
| CN | 101444693 A | 6/2009 |
| CN | 101500704 A | 8/2009 |
| CN | 101564634 A | 10/2009 |
| CN | 101596390 A | 12/2009 |
| CN | 201363833 Y | 12/2009 |
| CN | 201618493 U | 11/2010 |
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0 475 493 A2 | 3/1992 |
| EP | 2 465 596 A1 | 6/2012 |
| ES | 2 387 791 A1 | 10/2012 |
| JP | 56-158126 A | 12/1981 |
| JP | 59-225232 A | 12/1984 |
| JP | 60-194243 A | 10/1985 |
| JP | 02-092373 A | 4/1990 |
| JP | 03-207936 A | 9/1991 |
| JP | 05-161843 A | 6/1993 |
| JP | 06-031132 A | 2/1994 |
| JP | 08-114335 A | 5/1996 |
| JP | 09-085043 A | 3/1997 |
| JP | 2000-202232 A | 7/2000 |
| JP | 2000-291978 A | 10/2000 |
| JP | 2001-170435 A | 6/2001 |
| JP | 2001-232127 A | 8/2001 |
| JP | 3207936 B2 | 9/2001 |
| JP | 2004-150778 A | 5/2004 |
| JP | 2005-090941 A | 4/2005 |
| JP | 2006-275487 A | 10/2006 |
| JP | 2009-150623 A | 7/2009 |
| JP | 2009-202137 A | 9/2009 |
| JP | 2010-149086 A | 7/2010 |
| WO | WO 88/05693 A1 | 8/1988 |
| WO | WO 02/08160 A1 | 1/2002 |
| WO | WO 02/12796 A2 | 2/2002 |
| WO | WO 2006/016345 A1 | 2/2006 |
| WO | WO 2007/128584 A1 | 11/2007 |
| WO | WO 2008/155543 A2 | 12/2008 |
| WO | WO 2009/126607 A2 | 10/2009 |
| WO | WO 2010/091831 A1 | 8/2010 |
| WO | WO 2010/124388 B3 | 11/2010 |
| WO | WO 2011/114168 A1 | 9/2011 |
| WO | WO 2011/146478 A1 | 11/2011 |
| WO | WO 2012/071475 A1 | 5/2012 |
| WO | WO 2012/100149 A1 | 7/2012 |
| WO | WO 2012/120173 A1 | 9/2012 |
| WO | WO 2012/134415 A1 | 10/2012 |
| WO | WO 2012/145303 A2 | 10/2012 |
| WO | WO 2012/152930 A1 | 11/2012 |
| WO | WO 2012/158911 A2 | 11/2012 |
| WO | WO 2013/012622 A1 | 1/2013 |
| WO | WO 2013/074973 A1 | 5/2013 |
| WO | WO 2013/106573 A1 | 7/2013 |
| WO | WO 2014/015138 A2 | 1/2014 |
| WO | WO 2014/047632 A1 | 3/2014 |
| WO | WO 2014/078708 A1 | 5/2014 |
| WO | WO 2014/153333 A1 | 9/2014 |
| WO | WO 2014/176319 A1 | 10/2014 |

OTHER PUBLICATIONS

Ashrae. Ansi/Ashrae Standard 62.Jan. 2013 Ventilation for Acceptable Indoor Air Quality. American Society of Heating, Refrigerating and Air-Conditioning Engineers, Inc., Atlanta, GA; 2013, 58 pages.

Bennett, D. et al. (Oct. 2011) Indoor Environmental Quality and Heating, Ventilating, and Air Conditioning Survey of Small and Medium Size Commercial Buildings: Field Study. California Energy Commission. CEC-500-2011-043, 233 pages.

Gesser, H.D., "The Reduction of Indoor Formaldehyde Gas and that Emanating from Urea Formaldehyde Foam Insulation," Environmental International, 10:305-308 (1984).

Goeppert, A. et al., "Carbon Dioxide Capture from the Air Using a Polyamine Based Regenerable Solid Adsorbent," J. Am. Chem. Soc., 133:20164-20167 (2011).

Gray, M.L. et al., "Performance of immobilized tertiary amine solid sorbents for the capture of carbon dioxide," International Journal of Greenhouse Gas Control, 2:3-8 (2008).

Hodgson, A.T. and Levin, H. (Apr. 21, 2003) Volatile Organic Compounds in Indoor Air: A Review of Concentrations Measured in North America Since 1990. Report LBNL-51715. Berkeley, California: Environmental Energy Technologies Division, E.O, Lawrence Berkeley National Laboratory; 31 pages.

Hotchi, T. et al. (Jan. 2006) "Indoor Air Quality Impacts of a Peak Load Shedding Strategy for a Large Retail Building" Report LBNL-59293. Berkeley, California: Environmental Energy Technologies Division, E.O. Lawrence Berkeley National Laboratory; 17 pages.

Jones, C.W., "CO2 Capture from Dilute Gases as a Component of Modern Global Carbon Management," Annu. Rev. Chem. Biomol. Eng., 2:31-52 (2011).

Kang, D-H. et al. (Jun. 14, 2007) "Measurements of VOCs emission rate from building materials during bakeout with passive sampling methods" Clima 2007 WellBeing Indoors, REHVA World Congress, Jun. 10-14, 2007, Helsinki, Finland. O. Seppänen and J. Säteri (Eds.) FINVAC [online]. Retrieved from: http://www.inive.org/members_area/medias/pdf/ Inive%5Cclima2007%5CA12%5CA12C1334.pdf, 6 pages.

Ma, C. et al., "Removal of low-concentration formaldehyde in air by adsorption on activated carbon modified by hexamethylene diamine," Carbon, 49:2873-2875 (2011).

Nuckols, M. L. et al., Technical Manual: Design Guidelines for Carbon Dioxide Scrubbers. Naval Coastal Systems Center, NCSC TECH MAN 4110, Revision A, Jul. 1985, 10 pages.

Offerman, F.J. et al. (1991) "A Pilot Study to Measure Indoor Concentrations and Emmission Rates of Polycyclic Aromatic Hydrocarbons" Indoor Air, 4:497-512.

Serna-Guerrero, R. et al., "Triamine-grafted pore-expanded mesoporous silica for CO2 capture: Effect of moisture and adsorbent regeneration strategies," Adsorption, 16:567-575 (2010).

Sidheswaran, M. A. et al., "Energy efficient indoor VOC air cleaning with activated carbon filter (ACF) filters," Building and Environment, 47:357-367 (2012).

United States Environmental Protection Agency, "Carbon Adsorption for Control of VOC Emissions: Theory and Full Scale System Performance", EPA-450/3-88-012, Jun. 1988, 84 pages.

United States Environmental Protection Agency, "EPA Ventilation and Air Quality in Offices, Fact Sheet" Air and Radiation (6609J), 402-F-94-003, Revised Jul. 1990, 4 pages.

Wu, X. et al. (2011) "Volatile Organic Compounds in Small- and Medium-Sized Commercial Buildings in California. Suporting Information" Environ Sci Technol, 45(20):S1-S29 [online]. Retrieved from: https://pubs.acs.org/doi/suppl/10.1021/es202132u/suppl_file/es202132u_si_001.pdf.

Zorflex® ACC, 100% Activated Woven Carbon Cloth. Calgon Carbon Corporation, 2008, www.calgoncarbon.com, 2 pages.

(56) References Cited

OTHER PUBLICATIONS

Zorflex® ACC, 100% Activated Woven Carbon Cloth, Calgon Carbon Corporation, 2011, www.calgoncarbon.com, 2 pages.
Non-Final Office Action dated Apr. 20, 2016, for U.S. Appl. No. 14/403,562, 13 pages.
Notice of Allowance, dated Sep. 30, 2016, for U.S. Appl. No. 14/403,562, 10 pages.
Non-Final Office Action, dated Aug. 13, 2018, for U.S. Appl. No. 15/430,359, 16 pages.
Final Office Action, dated Mar. 5, 2019, for U.S. Appl. No. 15/430,359, 8 pages.
Notice of Allowance, dated Aug. 21, 2019, for U.S. Appl. No. 15/430,359, 8 pages.
Chinese Application No. 2013 80026112.8: English translation of First Office Action, dated Dec. 25, 2015, 7 pages.
Chinese Application No. 201380026112.8: English translation of Second Office Action, dated Nov. 15, 2016, 3 pages.
Chinese Application No. 201380026112.8: English translation of Third Office Action, dated May 22, 2017, 8 pages.
International Search Report and Written Opinion, dated Jan. 3, 2014, for International Application No. PCT/US2013/04223 9, 23 pages.
International Preliminary Report on Patentability, dated Nov. 25, 2014, for PCT/US2013/042239, 18 pages.
Pickenpaugh, Joseph G., Capt(Mar. 2013) *Assessment of Potential Carbon Dioxide-Based Demand Control Ventilation System Performance in Single Zone Systems*. Thesis, Air Force Institute of Technology. https://apps.dtic.mil/dtic/tr/fulltext/u2/a576145.pdf; 105 pages.
Chinese Application No. 201810059771.6: English translation of Second Notification of Office Action, dated May 12, 2021, 10 pages.

* cited by examiner

EFFICIENT USE OF ADSORBENTS FOR INDOOR AIR SCRUBBING

CROSS REFERENCE TO RELATED APPLICATIONS

This application is a continuation of and claims priority to and the benefit of all of: U.S. patent application Ser. No. 15/430,359, filed Feb. 10, 2017 and entitled "Efficient Use of Adsorbents for Indoor Air Scrubbing" (U.S. Pat. No. 10,525,401), which is a continuation of U.S. patent application Ser. No. 14/403,562, filed Nov. 24, 2014, and entitled "Efficient Use of Adsorbents for Indoor Air Scrubbing," which in turn is a 35 U.S.C. § 371 national stage entry of PCT/US2013/042239, which has an International filing date of May 22, 2013 and which claims priority to: U.S. Provisional Patent Application No. 61/650,204, filed May 22, 2012 and entitled "Air Management Systems with Integrated Ventilation and Scrubbing Functionality"; U.S. Provisional Patent Application No. 61/664,168, filed Jun. 26, 2012 and entitled "Optimal Adsorption-Regeneration Cycle for Indoor Air Scrubbing"; U.S. Provisional Patent Application No. 61/664,748, filed Jun. 27, 2012, and entitled "Optimal Adsorption-Regeneration Cycle for Indoor Air Scrubbing"; and U.S. Provisional Patent Application No. 61/704,796, filed Sep. 24, 2012 and entitled "Air Management Systems". The disclosures of each of the above applications are incorporated herein by reference in their entireties.

TECHNICAL FIELD

Embodiments of the present disclosure generally relate to air management systems and particularly to air management systems including adsorbent based air treatment systems.

BACKGROUND

Heating, Ventilation and Air-Conditioning ("HVAC") systems provide circulation of indoor air in enclosed environments, including buildings and structures of all kinds, vehicles, and vessels. The HVAC system's primary role is to maintain comfortable temperature and humidity, as well as good indoor air quality. In order to maintain good air quality, the circulating air should be refreshed, either by continually replacing it with fresh air from outside the enclosed environments, or by treating it for removal of unwanted contaminants that tend to form or buildup in the enclosed environments. The contaminants may also be referred to as pollutants, or substances. These pollutants may include carbon dioxide ($CO_2$) as well as volatile organic compounds (VOCs), inorganic gases like sulfur oxides, nitrous oxides, carbon monoxide, radon and others. Particles and microorganisms also represent non-gaseous pollutants that affect indoor air quality and should be filtered or removed. Since replacement of indoor air may not provide a satisfactory solution—whether due to the thermal load it imposes on the HVAC system, or due the poor air quality of the outside air, or lack of access to outside fresh air, indoor air may be treated by means of adsorbents to remove gas pollutants.

As adsorbents collect pollutants from the air, they gradually become saturated and lose their adsorptive efficiency. In order to use adsorbents for an extended service period, it is often necessary to periodically purge them in a process known as regeneration. Regeneration may be performed by streaming a purge gas (which may also be referred to as a regeneration gas) over and/or through the adsorbent. For example, the adsorbent may be flushed with air or some other gas that has a higher temperature and/or lower partial pressure of pollutants, or by heating the adsorbent itself, whereby the pollutant molecules are carried off the adsorbent surface. Thus, adsorbents are often used in an adsorption-desorption "swing cycle" where in the adsorption, or cleaning, part of the cycle, they capture certain species of gases, and continue to do so until the adsorbent reaches saturation. During desorption, or a regeneration cycle, they release the gases which were adsorbed until they recover their original capacity and adsorption efficiency, at which point a new cycle can begin. The swing cycle can be at least one of, for example, a temperature-swing cycle, pressure-swing cycle, or a concentration-swing adsorption cycle. In some cases both temperature and concentration, or temperature and pressure, may be changed during regeneration.

The use of regenerable adsorbents for removing carbon dioxide ($CO_2$) and VOCs in indoor air, relying on a swing cycle is an important alternative to air replacement, especially when the outside conditions make air replacement energetically costly, environmentally undesirable or otherwise impractical. However regeneration economics and performance are critical, as regeneration represents downtime for the air treatment function and energy must be consumed to flow the purge gas and release the pollutants. Finding the optimal economic and functional performance is further complicated by varying conditions of pollutant species and concentration levels, as well as temperature and flow rates.

SUMMARY OF DISCLOSURE

In some embodiments of the present disclosure systems and methods are described for removal of $CO_2$ and other pollutants from indoor air using adsorbents and a temperature- or concentration-swing adsorption cycle.

In some embodiments of the present disclosure reversing the direction of flow during regeneration can provide advantages when one type of pollutant is present and when more than one type of pollutant is present.

In accordance with some embodiments there is provided a method for reducing the level of at least one pollutant contained in indoor air from a human-occupied, enclosed environment. The method may comprise providing an air treatment assembly including at least one type of adsorbent, the adsorbent may be configured for capturing at least one pollutant entrained in an indoor air flow from the enclosed environment and regenerating upon exposure to a regenerating gas flow; streaming the indoor air flow over and/or through the adsorbent in a first direction such that the adsorbent captures at least some of the pollutant from the indoor air flow, where after being flowed over and/or through the adsorbent, the air flow comprises a scrubbed air flow; and streaming the regeneration gas flow over and/or through the adsorbent in a second direction opposite to the first direction, such that the regeneration gas flow regenerates at least some of the adsorbent and purges at least some of the pollutant from the adsorbent.

In accordance with some embodiments the air treatment assembly comprises at least two adsorbents such that the streaming indoor air flows through a first adsorbent and subsequently through a second adsorbent, and that as a result of the reversal of the flow direction during regeneration, substances purged from the first adsorbent do not flow across the second adsorbent.

In accordance with some embodiments, pollutants may be released from the one adsorbent during regeneration and may accumulate in the air treatment assembly or air conduits attached to it, and as a result of the reversal of the flow direction during regeneration, the released pollutants are substantially prevented from accumulating downstream from the adsorbent and accumulate substantially in sections of the air treatment assembly that are upstream from the adsorbent, the air treatment assembly may comprise an inlet for indoor air flowing through the adsorbent and upstream the adsorbent being in greater proximity to the inlet than downstream the adsorbent.

In accordance with some embodiments the pollutant and/or first gas may be selected from the group consisting of: carbon dioxide, volatile organic compounds, sulfur oxides, radon, nitrous oxides and carbon monoxide. The adsorbent may comprise at least one of an amine supported by a solid, activated carbon, clay, carbon fibers, silica, alumina, zeolites, molecular sieves, titanium oxide, polymer, porous polymers, polymer fibers and metal organic framework. The supporting solid may be at least one of silica, carbon, clay or metal oxide. The adsorbent may comprise granular solids or pelleted shaped solids.

In accordance with some embodiments there is provided a computer implemented method for reducing the level of at least one pollutant contained in indoor air from an enclosed, human-occupied environment. The method may comprise streaming an indoor air flow over and/or through an adsorbent provided within an air treatment assembly in a first direction, the indoor air flow containing at least one pollutant from inside the enclosed environment, such that the adsorbent captures at least some of the pollutant from the indoor air, where after being flowed over and/or through the adsorbent, the air flow comprises a scrubbed air flow, determining a level of an adsorption efficiency, where the adsorption efficiency at any point in time during the one cycle has a value of $1-C_{in}/C_{out}$, where $C_{in}$ is the concentration of the pollutant in the incoming air flow and $C_{out}$ is the concentration of the pollutant in an outgoing air flow, and where an initial adsorption efficiency value is the adsorption efficiency value at the beginning of the adsorption phase, where the adsorption efficiency value is less than the initial adsorption efficiency value, streaming a regeneration air flow through the air treatment assembly and over and/or through the adsorbent in a second direction opposite to the first direction, such that the regeneration air flow regenerates at least some of the adsorbent and purges at least some of the at least one pollutant from the adsorbent, where at least one of the above is performed by a processor.

In accordance with some embodiments there is provided a system for reducing the level of at least one pollutant contained in indoor air from an enclosed, human-occupied environment. The method may comprise an air treatment assembly including an adsorbent, the adsorbent may be configured for capturing at least one pollutant entrained in an indoor air flow and regenerating upon exposure to a regenerating gas flow; and streaming means for streaming the indoor air flow over and/or through the adsorbent in a first direction, such that the adsorbent captures at least some of the at least one pollutant from the indoor air flow, and streaming the regeneration air flow over and/or through the adsorbent in a second direction opposite to the first direction, such that the regeneration gas flow regenerates at least some of the adsorbent and purges at least some of the pollutant from the adsorbent.

In accordance with some embodiments there is provided a system for reducing the level of at least one pollutant contained in indoor air from an enclosed, human-occupied environment. The system may comprise an air treatment assembly including an adsorbent, the adsorbent configured for capturing at least one pollutant entrained in an indoor air flow and regenerating upon exposure to a regenerating gas flow, streaming means for streaming the indoor air flow over and/or through the adsorbent in a first direction, and/or for streaming the regeneration gas flow over and/or through the adsorbent in a second direction opposite to the first direction; at least one processor; a non-transitory machine-readable medium storing instructions that, when executed by the processor, perform the method, which may comprise: streaming the indoor air over and/or through the adsorbent in the first direction such that the adsorbent captures at least some of the pollutant from the indoor air; and determining a level of an adsorption efficiency, where the adsorption efficiency at any point in time during the one cycle has a value of $1-C_{in}/C_{out}$, where $C_{in}$ is the concentration of the pollutant in the incoming air flow and $C_{out}$ is the concentration of the pollutant in an outgoing air flow, and where an initial adsorption efficiency value is the adsorption efficiency value at the beginning of the adsorption phase, where the adsorption efficiency value is less than the initial adsorption efficiency value, streaming of the regeneration gas flow over and/or through the adsorbent is performed.

In some embodiments, a method for controlling a scrubber containing an adsorbent, the scrubber configured to cycle between scrubbing at least one pollutant and/or first gas from a stream of gases with the at least one pollutant and/or first gas being adsorbed onto the adsorbent, and regenerating at least some of the adsorbent and thereby purging at least some of the at least one pollutant and/or first gas from the adsorbent via a regeneration gas flow. The method may comprise flowing a stream of gases through the scrubber, the scrubber comprising the adsorbent, adsorbing at least some of the one pollutant and/or first gas from the stream of gases onto the adsorbent during an adsorption phase over a first time period, purging a portion of the at least one pollutant and/or first gas from the adsorbent during a regeneration phase over a second time period with a regeneration gas flow, and cycling between the adsorption phase and the regeneration phase. The method may also include limiting at least one of: the duration of the first time period to a period of time which is less than the time required to have the adsorbent adsorb as much of the pollutant/gas as the adsorbent can adsorb complete adsorption phase, and the duration of the second time period to a period of time which is less than the time required to completely regenerate the adsorbent.

In accordance with some embodiments there is provided a method for reducing the level of at least one pollutant contained in indoor air from an enclosed, human-occupied environment. The method may comprise providing an air treatment assembly including an adsorbent, the adsorbent configured for capturing at least one pollutant entrained in an indoor air flow from the enclosed environment and regenerating upon exposure to a regenerating gas flow streaming the indoor air flow over and/or through the adsorbent in a first direction such that the adsorbent captures at least some of the at least one pollutant from the indoor air flow, where the streaming of the indoor air flow over and/or through the adsorbent comprises an adsorption phase; and streaming the regeneration gas flow over and/or through the adsorbent in a second direction opposite to the first direction, such that the regeneration air flow regenerates at least some of the adsorbent and purges at least some of the at least one pollutant from the adsorbent, where the streaming of the regeneration gas flow over and/or through the adsorbent comprises a regeneration phase, cycling between the adsorption phase and the regeneration phase, where one cycle comprises an adsorption phase followed by a regeneration phase, one cycle period comprises the total time elapsed during one cycle; the at least one pollutant purged from the adsorbent is carried away by the regeneration gas flow, and a complete regeneration phase comprises a time period for removing substantially all of the at least one pollutant from the adsorbent during the regeneration phase, and a complete adsorption phase comprises a time period for substantially saturating all the adsorbent during the adsorption; and limiting at least one of: the duration of the first time period to a period of time which is less than the complete adsorption phase, and the duration of the second time period to a period of time which is less than the complete regeneration phase.

In accordance with some embodiments prior to streaming the regeneration gas flow the method may further include determining a level of an adsorption efficiency, where the adsorption efficiency at any point in time during the one cycle has a value of $1-C_{in}/C_{out}$, where $C_{in}$ is the concentration of the pollutant in the incoming air flow and $C_{out}$ is the concentration of the pollutant in an outgoing air flow, and where an initial adsorption efficiency value is the adsorption efficiency value at the beginning of the adsorption phase, where the adsorption efficiency value is less than the initial adsorption efficiency value, streaming of the regeneration gas flow over and/or through the adsorbent is performed.

In accordance with some embodiments the adsorption efficiency value is at least about 20% less than the initial adsorption efficiency value. In accordance with some embodiments the adsorption efficiency value is at least about 30% less than the initial adsorption efficiency value. In accordance with some embodiments the adsorption efficiency value is at least about 50% less than the initial adsorption efficiency value. In accordance with some embodiments the adsorption efficiency value is at least about 80% less than the initial adsorption efficiency value.

In some embodiments of the present disclosure a key for optimal system economics is to terminate the regeneration phase and the adsorption phase before they are complete, as the rates of adsorption and desorption decline. A detailed analysis shows how to identify and set the optimal points at which to switch over from regeneration to adsorption and vice versa.

In accordance with some embodiments there is provided a method for controlling a scrubber containing an adsorbent, the scrubber may be configured to cycle between scrubbing at least one pollutant and/or first gas from a stream of gases with the pollutant and/or first gas being adsorbed onto the adsorbent, and regenerating at least some of the adsorbent and thereby purging at least some of the pollutant and/or first gas from the adsorbent via a regeneration gas flow. The method may include flowing a stream of gases through the scrubber, the scrubber comprising the adsorbent; adsorbing at least some of the pollutant and/or first gas from the stream of gases onto the adsorbent during an adsorption phase over a first time period; purging a portion of the pollutant and/or first gas from the adsorbent during a regeneration phase over a second time period with a regeneration gas flow, and cycling between the adsorption phase and the regeneration phase. One cycle may comprise at least an adsorption phase followed by a regeneration phase, one cycle period may comprise the total time elapsed during one cycle. The pollutant and/or first gas purged from the adsorbent may be carried away by the regeneration gas flow. A complete regeneration phase may comprise a time period for removing substantially all of the pollutant and/or first gas from the adsorbent during the regeneration phase, and a complete adsorption phase may comprise a time period for substantially saturating all the adsorbent during the adsorption. The method may include limiting at least one of: the duration of the first time period to a period of time which is less than the complete adsorption phase, and/or the duration of the second time period to a period of time which is less than the complete regeneration phase.

In accordance with some embodiments, the first time period may comprise about 95% of a complete adsorption phase. In accordance with some embodiments, the first time period is about 90% of a complete adsorption phase. In accordance with some embodiments, the first time period is about 80% of a complete adsorption phase. In accordance with some embodiments, the first time period is about 50% of a complete adsorption phase. In accordance with some embodiments, the first time period is about 20% of a complete adsorption phase. In accordance with some embodiments, the first time period comprises about 20% to about 95% of a complete adsorption phase.

In accordance with some embodiments, the second time period comprises about 95% of a complete regeneration phase. In accordance with some embodiments, the second time period is about 90% of a complete regeneration phase. In accordance with some embodiments, the second time period is about 80% of a complete regeneration phase. In accordance with some embodiments, the second time period is about 50% of a complete regeneration phase. In accordance with some embodiments, the second time period is about 20% of a complete regeneration phase. In accordance with some embodiments, the second time period comprises about 20% to about 95% of a complete regeneration phase.

In accordance with some embodiments, the regeneration phase may be terminated upon a regeneration rate $R(t_r)$ of the adsorbent being between about equal to and a predetermined amount less than a productivity p of the complete regeneration phase, where productivity $p=C/T$, and C equals an amount of the pollutant and/or first gas adsorbed by the adsorbent from the stream of gases during one cycle and T is the duration of one cycle period.

In accordance with some embodiments, the regeneration phase is terminated upon a regeneration rate $R(t_r)$ being between about equal to and about twice a productivity p of the complete regeneration phase, where productivity $p=C/T$, and C equals an amount of the pollutant and/or first gas adsorbed by the adsorbent from the stream of gases during one cycle and T is the duration of one cycle period.

In accordance with some embodiments, the pollutant and/or first gas may be selected from the group consisting of: carbon dioxide, volatile organic compounds, sulfur oxides, radon, nitrous oxides and carbon monoxide. The adsorbent may comprise at least one of: an amine supported by a solid, activated carbon, clay, carbon fibers, silica, alumina, zeolites, molecular sieves, titanium oxide, polymer, porous polymers, polymer fibers and metal organic frameworks. The supporting solid may be at least one of silica, carbon, clay or metal oxide. The adsorbent may comprise granular solids or pelleted shaped solids. The stream of gases may comprise air from an enclosed environment, outdoor air, flue gases, or nitrogen with elevated levels of carbon dioxide or organic contaminants, relative to substantially unpolluted air.

In accordance with some embodiments, the one cycle may further comprise at least one of: (i) a first switchover phase prior to the regeneration phase, and (ii) a second switchover phase following the regeneration phase. The second switchover phase may comprise a period of time to bring the adsorbent to a temperature to adsorb pollutant and/or first gas during the adsorption phase. The first switchover phase may comprise a period of time to bring the adsorbent to a temperature to release the at least one pollutant and/or first gas from the adsorbent during the regeneration phase.

In accordance with some embodiments, prior to streaming the regeneration gas flow the method may further include determining a level of an adsorption efficiency, where the adsorption efficiency at any point in time during the one cycle has a value of $1-C_{in}/C_{out}$, where $C_{in}$ is the concentration of the pollutant in the incoming air flow and $C_{out}$ is the concentration of the pollutant in an outgoing air flow, and where an initial adsorption efficiency value is the adsorption efficiency value at the beginning of the adsorption phase. The adsorption efficiency value is less than the initial adsorption efficiency value, streaming of the regeneration gas flow over and/or through the adsorbent is performed.

In accordance with some embodiments there is provided a system for controlling a scrubber, the system may comprise a scrubber containing an adsorbent, the scrubber may be configured to cycle between scrubbing at least one pollutant and/or first gas from a stream of gases with the at least one pollutant and/or first gas being adsorbed onto the adsorbent, and purging the at least one pollutant and/or first gas from the adsorbent via a regeneration gas flow; means for flowing the stream of gases through the scrubber and over and/or through the adsorbent, where the adsorbent adsorbs at least one pollutant and/or first gas from the stream of gases during an adsorption phase over a first time period; means for flowing the regeneration gas flow over the adsorbent for purging a portion of the pollutant and/or first gas from the adsorbent during a regeneration phase over a second time period with a regeneration gas flow, and means for cycling between the adsorption phase and the regeneration phase. One cycle may comprise one adsorption phase followed by one regeneration phase. One cycle period may comprise the total time elapsed during one cycle. The pollutant and/or first gas purged from the adsorbent may be carried away by the regeneration gas flow. A complete regeneration phase may comprise a time period for removing substantially all of the pollutant and/or first gas from the adsorbent during the regeneration phase. A complete adsorption phase comprises a time period for substantially saturating all the adsorbent during the adsorption. The duration of at least one of the following may be limited: the duration of the first time period to a period of time which is less than the complete adsorption phase, and the duration of the second time period to a period of time which is less than the complete regeneration phase.

In accordance with some embodiments, the means for cycling may comprise a processor and a non-transitory machine-readable medium storing instructions (for example), having computer instructions/code operating thereon for controlling cycling between the adsorption and regeneration phases.

In accordance with some embodiments there is provided a computer implemented method for controlling a scrubber containing an adsorbent, the scrubber may be configured to cycle between scrubbing at least one pollutant and/or first gas from a stream of gases with the at least one pollutant and/or first gas being adsorbed onto the adsorbent, and purging the at least one pollutant and/or first gas from the adsorbent via a purging gas flow, the method comprising: flowing a stream of gases through the scrubber, the scrubber including or comprising an adsorbent; adsorbing at least one pollutant and/or first gas from the stream of gases onto the adsorbent during an adsorption phase over a first time period, purging a portion of the at least one pollutant and/or first gas from the adsorbent during a regeneration phase over a second time period with a regeneration gas flow, and cycling between the adsorption phase and the regeneration phase. One cycle may comprise one adsorption phase followed by one regeneration phase. One cycle period may comprise the total time elapsed during one cycle. At least one pollutant and/or first gas purged from the adsorbent may be carried away by the regeneration gas flow. A complete regeneration phase comprises a time period for removing substantially all of the pollutant and/or first gas from the adsorbent during the regeneration phase. A complete adsorption phase may comprise a time period for substantially saturating all the adsorbent during the adsorption. The method may include limiting at least one of: the duration of the first time period to a period of time which is less than the complete adsorption phase, and the duration of the second time period to a period of time which is less than the complete regeneration phase, where at least one of the above is performed by at least one processor.

In accordance with some embodiments there is provided a system for controlling a scrubber containing an adsorbent, the scrubber may be configured to cycle between scrubbing at least one pollutant and/or first gas from a stream of gases with the pollutant and/or first gas being adsorbed onto the adsorbent, and purging the pollutant and/or first gas from the adsorbent via a regeneration gas flow. The system may comprise at least one processor and a non-transitory machine-readable medium storing instructions that, when executed by the at least one processor, perform the method which may comprise: flowing a stream of gases over and/or through the adsorbent, where the adsorbent adsorbs at least some of the pollutant and/or first gas from the stream of gases during an adsorption phase over a first time period; purging a portion of the pollutant and/or first gas from the adsorbent during a regeneration phase over a second time period with a regeneration gas flow, and cycling between the adsorption phase and the regeneration phase. One cycle may comprise one adsorption phase followed by one regeneration phase. One cycle period may comprise the total time elapsed during one cycle. At least one pollutant and/or first gas purged from the adsorbent may be carried away by the regeneration gas flow. A complete regeneration phase comprises a time period for removing substantially all of the pollutant and/or first gas from the adsorbent during the regeneration phase. A complete adsorption phase may comprise a time period for substantially saturating all the adsorbent during the adsorption. The method may include limiting at least one of: the duration of the first time period to a period of time which is less than the complete adsorption phase, and the duration of the second time period to a period of time which is less than the complete regeneration phase.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

DETAILED DESCRIPTION

Removing carbon dioxide ($CO_2$) and volatile organic compounds (VOCs) from indoor air, or reducing the level of at least one pollutant or a gas contained in indoor air from an enclosed environment, can pave the way for improved indoor air quality and lower energy costs in enclosed environments. In some embodiments, adsorbents, such as solid adsorbents, are used to scrub unwanted pollutants including gases and vapors, from indoor air, namely pollutants entrained in an indoor air flow from the enclosed environment. Adsorbents selective to $CO_2$ are known in the art and include, but are not limited to, various types of amines and solid-supported amines, as well as clays, molecular sieves, zeolites, various forms of silica and alumina, various forms of carbon, activated carbon, carbon fibers, titanium oxide, porous polymers, polymer fibers and metal organic frameworks.

Adsorbents selective to VOCs may include molecular sieves, activated carbon, zeolites, carbon fibers and carbon particles, for example. In some embodiments more than one type of adsorbent is used.

In some embodiment there may be a first layer or bed of an adsorbent for capturing $CO_2$, and a second layer of an adsorbent for capturing VOCs, positioned downstream from the first layer, relative to the direction of the air flow of incoming indoor air. In some embodiments, the first layer may comprise solid supported amines for capturing $CO_2$, and the second layer may comprise carbon adsorbents for capturing VOCs.

Figure 1A:
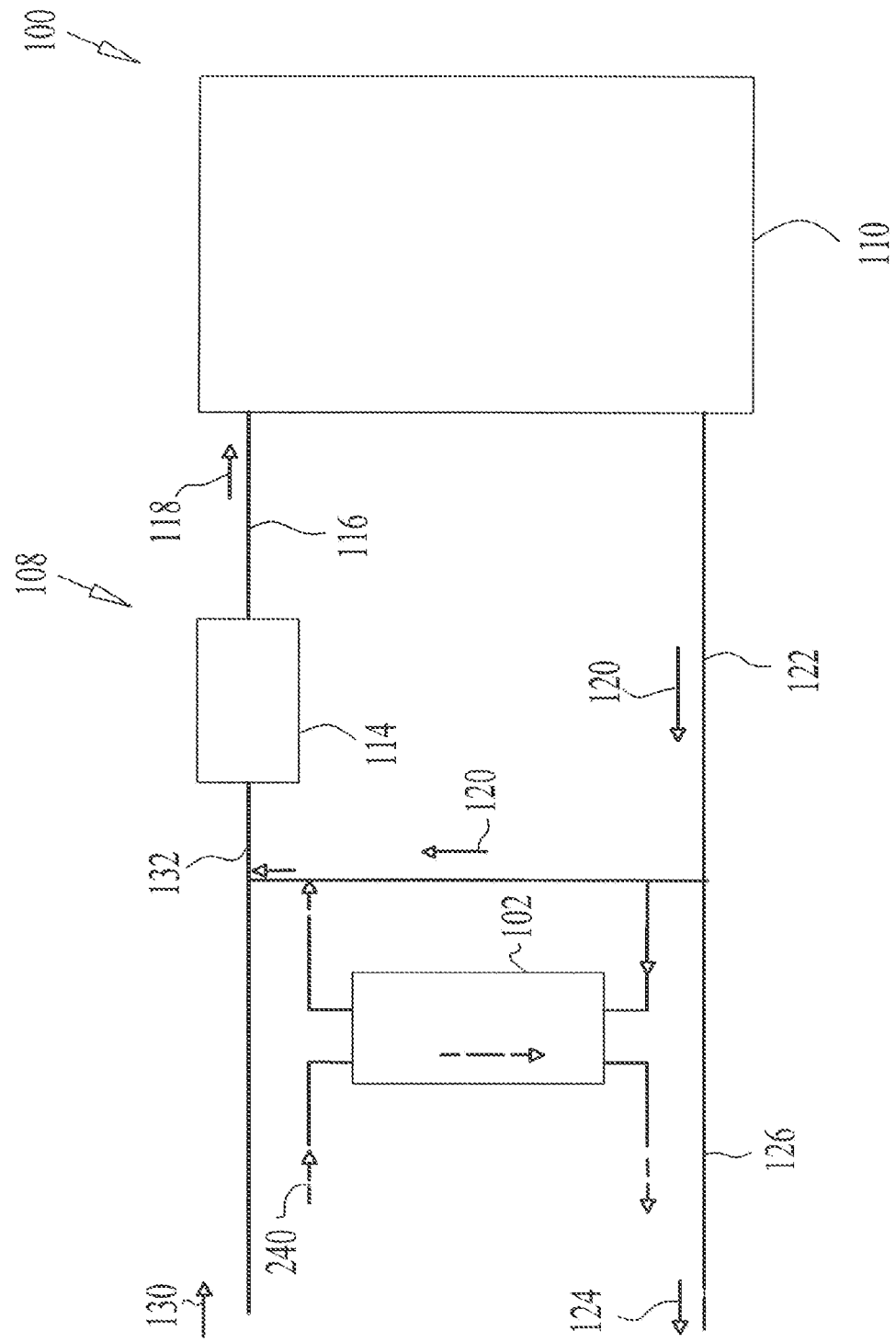
FIGS. 1A-1C are each a schematic illustration of an air management system according to some embodiments of the present disclosure.
Figure 1B:
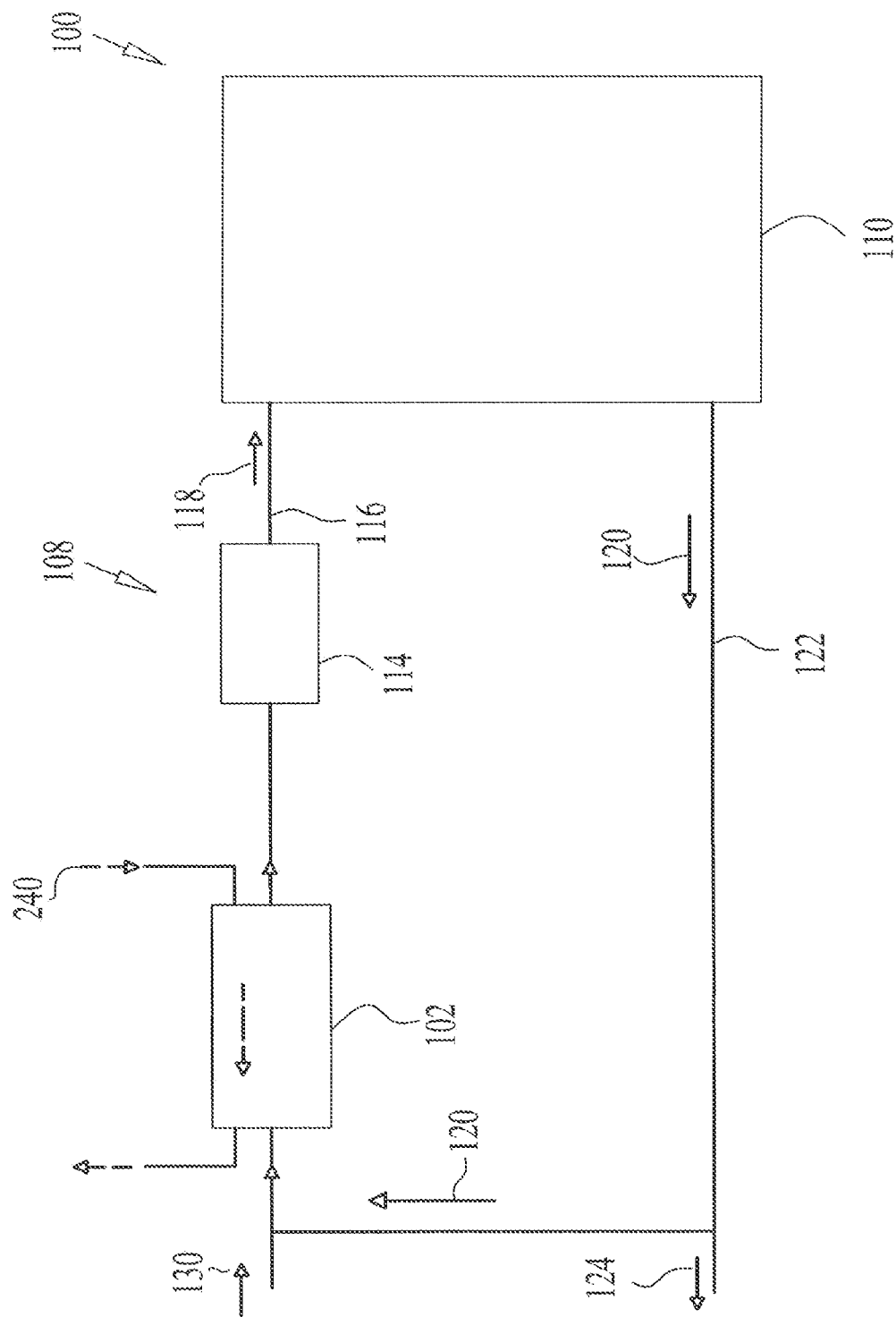
Figure 1C:
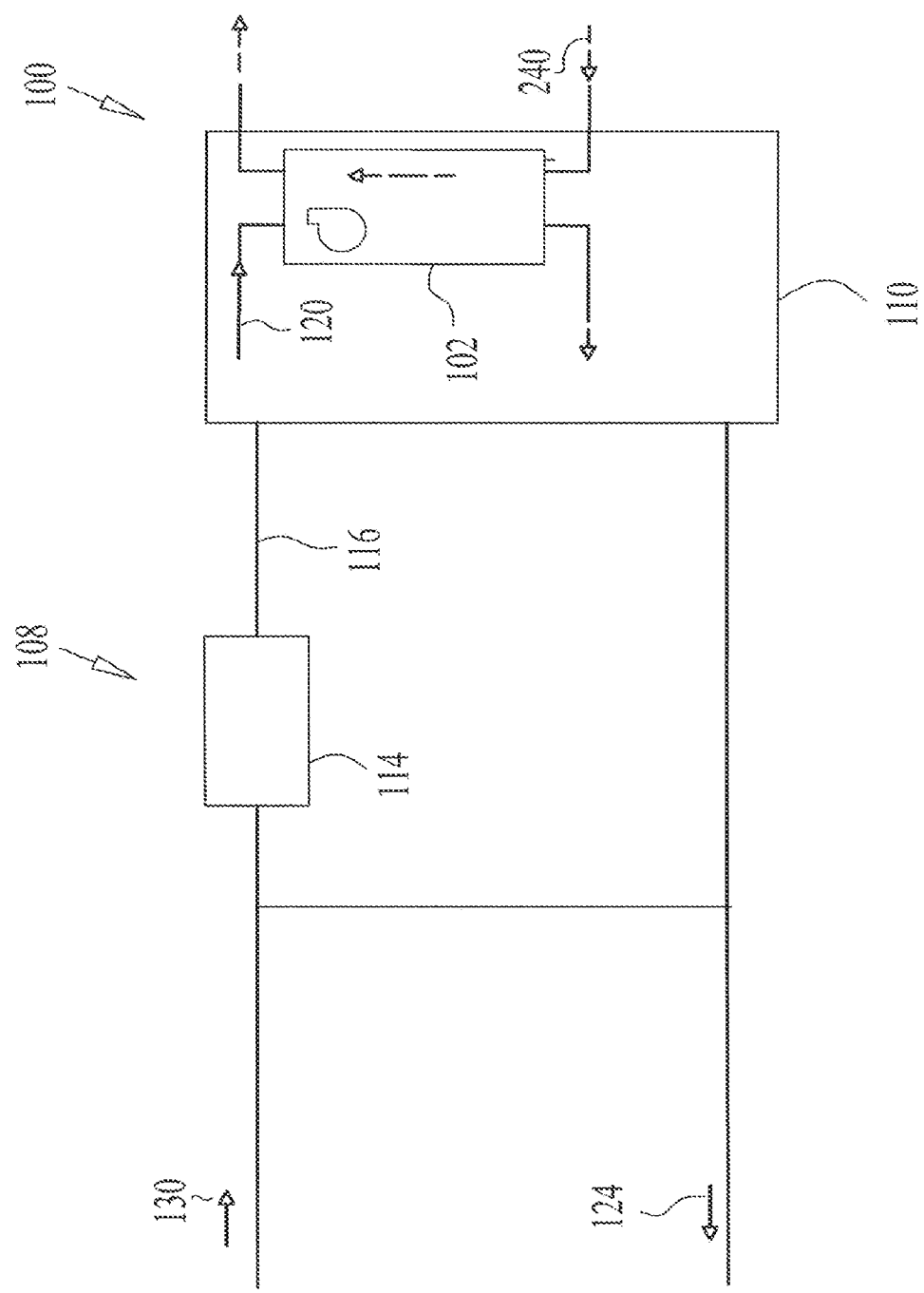

FIGS. 1A-1C are each a schematic illustration of an air management system 100 including a scrubber, which may be referred to as an air treatment assembly 102. The air management system 100 may include an air circulation system, such as a central HVAC system 108 provided to manage and circulate indoor air within an enclosed environment 110.

The enclosed environment 110 may comprise an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.) and/or any combination thereof.

The HVAC system 108 shown in FIGS. 1A-1C may comprise an air handling unit 114 in fluid communication with the enclosed environment 110. The air handling unit 114 may provide air circulation to various parts of the enclosed environment 110 by means of ducts 116 or conduits, as shown in FIGS. 1A-1C. The air handling unit 114 may include any suitable configuration for conditioning the temperature and humidity of the air flowing through it. Conditioned air exiting the air handling unit 114 may be provided to the enclosed environment 110 as supply air 118. Return air 120, which is indoor air 120 from the enclosed environment 110, may exit the enclosed environment 110 via ducts 122 or a plenum or any other suitable means.

In some embodiments, a portion of the return air 120 may be exhausted as exhaust air 124, directly or via ducts 126. Outside, fresh air 130 may be introduced into the air handling unit 114 via ducts 132.

The air treatment assembly 102 may be placed in any suitable location within the enclosed environment relative to the air management system 100 and is configured to receive at least a portion of the indoor air. In some embodiments, as shown in FIG. 1A, the air treatment assembly 102 is placed in parallel to the air handling unit 114. A portion of the return air 120 may flow to the air treatment assembly 102 and thereafter to the air handling unit 114 and the remaining portion may flow directly to the air handling unit 114 and/or may be exhausted as exhaust air 124, via ducts 126.

In some embodiments, as shown in FIG. 1B, the air treatment assembly 102 is placed in series with the air handling unit 114, either upstream relative to the air handling unit 114 or downstream thereof. A portion of the return air 120 may flow to the air treatment assembly 102 and thereafter to the air handling unit 114 and a portion may be exhausted as exhaust air 124, via ducts 126.

In some embodiments, as shown in FIG. 1C, the air treatment assembly 102 is not in direct fluid communication with the air handling unit 114, and may be placed within the enclosed environment 110. A portion of circulating indoor air 120 may flow into the air treatment assembly 102 and thereout, back into the enclosed environment 110.

Figure 2A:
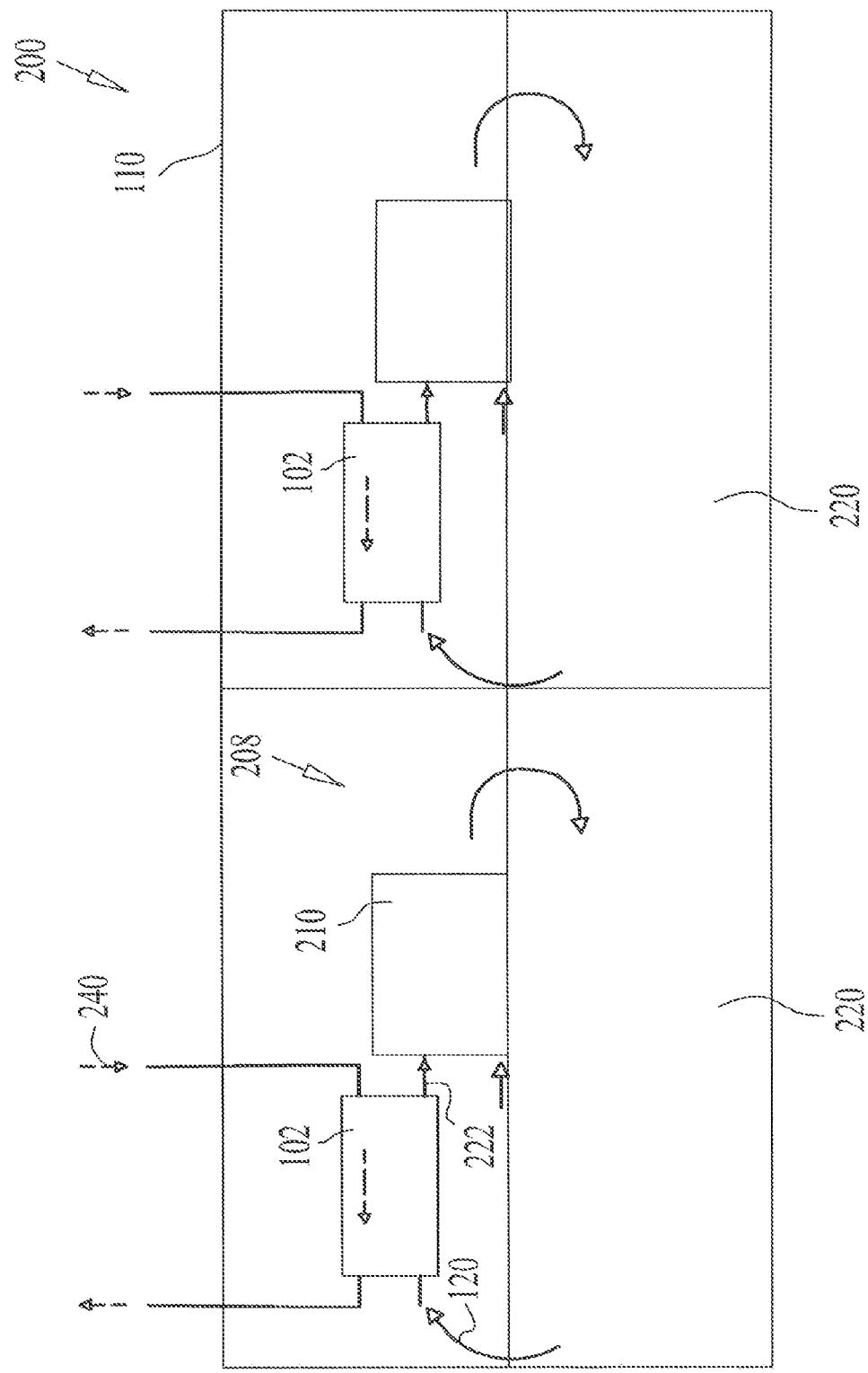
FIGS. 2A and 2B are each a schematic illustration of an air management system according to some embodiments of the present disclosure.
Figure 2B:
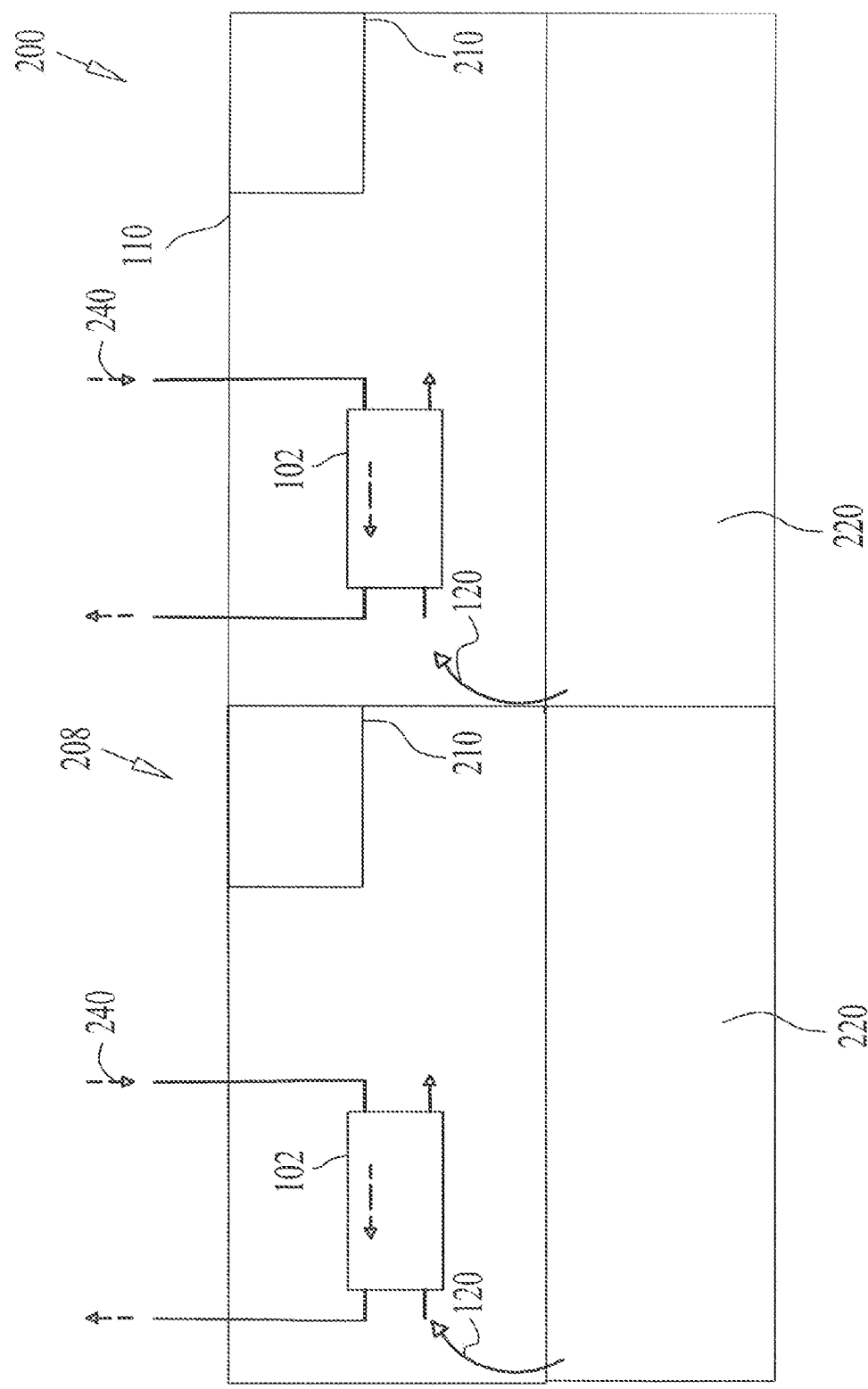

FIGS. 2A and 2B are each a schematic illustration of an air management system 200 comprising the air treatment assembly 102. The air management system 200 may include a distributed air circulation system 208 comprising one or more fan-coil units 210 provided to manage and circulate indoor air within the enclosed environment 110.

In some embodiments, as seen in FIGS. 2A and 2B, the enclosed environment 110 may comprise a plurality of rooms 220. A fan-coil unit 210 may be placed in one or more of the rooms 220. An air treatment assembly 102 may be placed in one or more of the rooms 220. At least a portion of return air 120, comprising indoor air from the room 220, may flow into the air treatment assembly 102 and a separate stream of air may flow into the fan-coil unit 210 and/or may be exhausted out of the room 220.

The air treatment assembly 102 may be placed at any suitable location. In some embodiments, as shown in FIG. 2A, scrubbed air flowing out of the air treatment assembly 102 may flow directly to the fan-coil unit 210 via a duct 222.

In some embodiments, as shown in FIG. 2B, the air treatment assembly 102 may not be in direct fluid communication with the fan-coil unit 210. At least a portion of indoor air 120 may flow into the air treatment assembly 102 and a portion may flow into the fan-coil unit 210.

Figure 3:
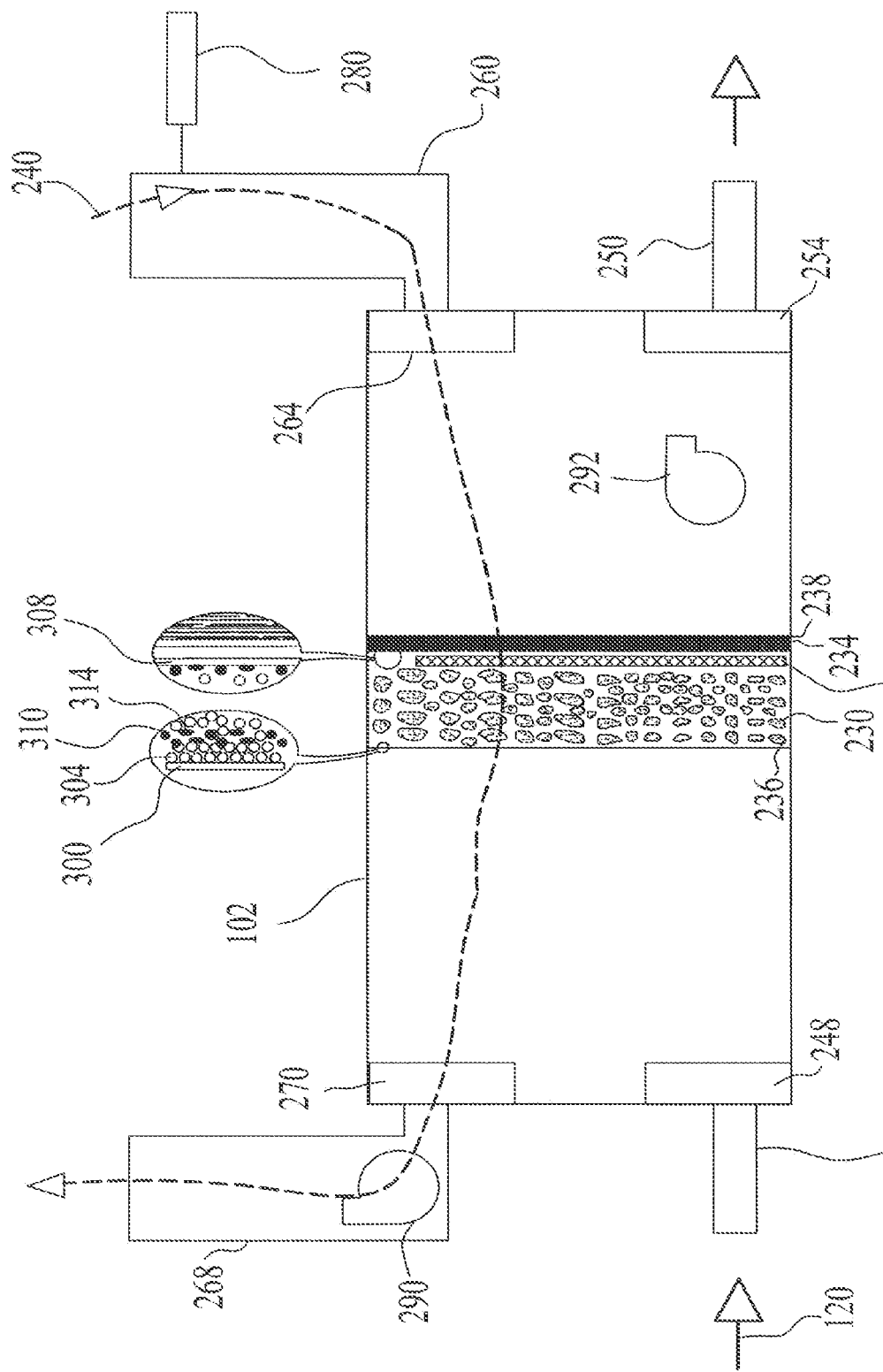
FIG. 3 is a schematic illustration of an air treatment assembly according to some embodiments of the present disclosure.

In accordance with some embodiments, as seen in FIG. 3, the air treatment assembly 102 may be provided to reduce the concentration of unwanted substances or pollutants present in the air introduced therein. The air treatment assembly 102 may comprise one or more adsorbent beds or layers for one or more types of pollutants. For example, a first adsorbent 230 may be provided for capturing gas pollutants, such as $CO_2$ and a second adsorbent 234 may be provided for capturing other gas pollutants, such as VOCs. Examples of air treatment assemblies are disclosed in applicant's U.S. Pat. No. 8,157,892, which is incorporated herein by reference in its entirety.

The $CO_2$ adsorbent 230 may comprise a solid supported amine, such as disclosed in applicant's PCT application PCT/US12/38343, which is incorporated herein by reference in its entirety.

In the example of FIG. 3, the first adsorbent 230 may be formed of an adsorbent bed comprising adsorbent particles 236. The adsorbent particles 236 may comprise solid supported amines or any other adsorbent material, in any suitable form, such as granular solids or pelleted shaped solids, for example. The second adsorbent 234 may be formed of a layer 238 comprising a carbon cloth or any other suitable material.

During scrubbing, the air treatment assembly 102 may operate in a cycle comprising an adsorption phase and a regeneration phase. In the adsorption phase the pollutants, such as the $CO_2$ or VOCs, are first captured and adsorbed by the adsorbents, which as described above, may comprise one or more adsorbents, such as adsorbents 230 and 234. Following the capture of these pollutants in the adsorption phase, the adsorbent may be regenerated during the regeneration phase by urging the release of the pollutants therefrom.

The regeneration may be performed in any suitable manner. For example, regeneration may be performed by exposing, (e.g. by flushing) the adsorbent to a purge gas for purging and releasing at least a portion of the pollutants therefrom.

In some embodiments, the purge gas may comprise outdoor air 240. The outdoor air 240 may be heated prior to entering the air treatment assembly 102 by any suitable method, such as will be further described.

Incoming contaminated indoor air 120 from the enclosed environment 110 is shown in FIGS. 1A-3 as flowing in a first direction into the air treatment assembly 102 through an aperture or a first inlet 244, which may be controlled by an inlet damper 248 or any other suitable means. Scrubbed air may exit the air treatment assembly 102 via an oppositely facing aperture or second outlet 250, which may be controlled by an outlet damper 254 or any other suitable means. The incoming side is referred to as upstream and the outgoing side as downstream.

During the regeneration phase the outdoor air 240, shown as a dashed line, may flow into the air treatment assembly 102 via an inlet 260, which may be controlled by an inlet damper 264. The outside air 240 may flow out of the air treatment assembly 102 via an outlet 268, which may be controlled by an outlet damper 270. The inlet damper 264 and outlet damper 270 may be open during the regeneration phase while the inlet damper 248 and outlet damper 254 are generally closed.

During the adsorption phase the inlet damper 264 and outlet damper 270 may be closed while the inlet damper 248 and outlet damper 250 are generally open.

In some embodiments, the outdoor air 240 may flow into a heating subassembly 280 for heating the outdoor air 240 therein before entering the air treatment assembly 102. Heating the outdoor air 240 may be performed in any suitable manner, such as by an electrical heating coil placed within the heating subassembly 280. Additional methods for heating the outdoor air 240 include: water coils using hot water provided from a separate source; direct or indirect solar heat; a furnace using gas or other fuel; a heat pump; or any other suitable source of heat. The outdoor air 240 may be heated from the ambient temperature to any suitable temperature, typically within a range of approximately 30-120° C. Alternatively, the outdoor air 240 may be heated to a temperature less than 80° C. Alternatively, the outdoor air 240 may be heated to a temperature less than 50° C. Alternatively, the outdoor air 240 may enter the air treatment assembly 102 at the ambient temperature without prior heating thereof.

It is noted that the heating subassembly 280 may be placed in any suitable location. For example, the heating subassembly 280 may be placed in proximity to the air treatment assembly 102 or may be located at a certain distance whereby warm, outdoor air 240 may be delivered from the heating subassembly 280 to the air treatment assembly 102 via a conduit (not shown).

In accordance with an embodiment, as shown in FIGS. 1A-3, the outdoor air 240, during the regeneration phase may flow in a second direction, which is the opposite direction of the indoor air flow during the adsorption phase (i.e. the first direction).

In order to enable the reverse direction of the air flow during regeneration, the air treatment assembly 102 may be configured with an appropriate fan 290 or fans that either pushes the outside air 240 into the air treatment assembly 102 near the inlet 260 or pulls the outside air 240 thereout at outlet 268, as shown in FIGS. 1A-3. The fan 290 can be part of the air treatment assembly 102 or can be incorporated into the air heating subassembly 280 or any other suitable location within the air management system 100 of FIG. 1A-1C or air management system 200 of FIGS. 2A and 2B.

The air treatment assembly 102 may comprise additional fans, such as fan 292, for pushing or pulling the return air 120 through the air treatment assembly 102.

In other embodiments the direction of air flow in regeneration is in the same direction of the return air flow.

The reverse air flow during the regeneration phase offers certain advantages which are best understood in relation to FIG. 3 and inserts thereof. During adsorption, pollutant laden air first encounters an upstream section or surface 300 of the adsorbent bed and the air is gradually depleted of $CO_2$ or other pollutants as it advanced through the bed, away from surface 300. The adsorbent material near this surface 300 receives the most contaminated air and as a result, there is typically a higher load of captured pollutants 304 in the upstream side of the adsorbent bed, than in an oppositely facing surface 308 in the downstream side of the adsorbent bed. During regeneration, if the flow is in the same direction of the return air flow, the pollutants carried from the upstream side are forced to flow through the entire bed on their way out, and through subsequent adsorbent layers (such as layer 238) if there are such. This may increase the likelihood that some of these purged pollutants will be recaptured. If the flow is reversed, the highest concentration of pollutants is removed backwards and away from the upstream section without passing through the bed. A similar dynamic may apply also to captured dust particles 310.

The considerations is also significant when a dual adsorbent system is deployed, such as with the second adsorbent 234, e.g. the VOC adsorbent layer 238, downstream from the first adsorbent 230, such as the $CO_2$ adsorbent. This is because the $CO_2$ adsorbent may release VOCs and particles or vapors 314 during regeneration. For example, a solid supported amine based $CO_2$ adsorbent may release some amine vapors 314 during high temperature regeneration. These vapors 314 are preferably exhausted directly and not forced to flow through the VOC adsorbent where they may be captured, thus loading and contaminating the VOC adsorbent 234 instead of allowing it to be purged and regenerated. By reversing the flow direction in regeneration, clean air passes though the VOC adsorbent 234 first and then through the CO2 adsorbent 230, so that any volatilized amines are carried away from the VOC adsorbent 234 rather than through it.

Furthermore, granular adsorbents 236 may release their own dust particles 310 and it is preferable to exhaust them without passing them through the air treatment assembly 102 downstream dust filter 320 or a fiber cloth, such as layer 238, where dust particles 310 can buildup and impede air flow.

The reverse air flow during the regeneration phase may be significant in any air treatment assembly including or comprising a single or plurality of adsorbents configured to adsorb any pollutants from incoming air.

In some embodiments, pollutants may be released from the adsorbent during regeneration and may accumulate in the air treatment assembly 102 or air conduits attached to it or sections of the air treatment assembly 102. As a result of the reversal of the flow direction during regeneration the released pollutants may be substantially prevented from accumulating downstream from the adsorbent and accumulate substantially in sections of the air treatment assembly that are upstream from the adsorbent. Upstream the adsorbent may also be defined as being in greater proximity to the inlet 244 than downstream the adsorbent.

It is noted in reference to FIGS. 1A-3, that any other suitable means besides dampers, such as valves, fans or shutters, may be used to control the volume of air entering and/or exiting the air treatment assembly 102 or flowing the incoming air (or stream of gases) through the air treatment assembly 102. Additionally, blowers or any other suitable means for urging flow of air may be used in place of or in addition to the fans of the air treatment assembly 102.

It is further noted in reference to FIGS. 1A-3, that any suitable streaming means may be provided, such as dampers, fans, (such as shown in FIG. 3), valves, and/or shutters and ducts inlets and outlets (such as shown in FIGS. 1A-3) and/or conduits. The streaming means may be used for streaming the indoor air flow over and/or through the adsorbent in the first direction, such that the adsorbent captures at least the pollutant or first gas from the indoor air flow. The streaming means may further be used for streaming the regeneration air flow over and/or through the adsorbent in the second direction opposite to the first direction, such that the regeneration gas flow regenerates at least some of the adsorbent and purges at least some of the pollutant from the adsorbent.

In some embodiments, the air management system 100 of FIG. 1A-1C or air management system 200 of FIGS. 2A and 2B may include fans, and dampers or any other suitable means for circulating air therein.

Optimizing the Cycle Length and Regeneration Time

Due to the need to treat large volumes of air for extended periods of time with a finite amount of adsorbent, it is advantageous to generally continually reuse the same adsorbent by means of a temperature swing cycle or a concentration swing cycle or some combination thereof. The problem is particularly important in the case of $CO_2$ due to its large cumulative volumes, but in principle carries over to most other gases and vapors. Generally that means that the adsorbent undergoes a cycle with several phases in each cycle. In the adsorption phase, the adsorbent selectively captures and removes certain gases from the air flow, and in the regeneration phase it releases the captured gases, presumably to a purge gas that is exhausted. During regeneration one or both of the following conditions may be met, (a) the adsorbent is warmer than it was during adsorption and/or (b) the incoming purge gas has lower partial pressure of the released pollutants.

As the adsorption phase progresses, the adsorbent gradually becomes saturated with $CO_2$ (or other pollutants) and its ability to adsorb begins to degrade, eventually stopping adsorption entirely. The transition can be gradual or fairly sharp, depending on a number of parameters including the flow rate, temperature, thickness of adsorbent bed, and of course the chemistry and structural properties of the adsorbent.

During the regeneration phase the adsorbent is purged. The amount of adsorbed gas that is released is initially high and then gradually declines as the adsorbent is depleted from the captured gas. As the amount of gas released tapers off, a substantial fraction of the regeneration time is spent on extracting a small residual fraction of the amount of pollutants.

In some embodiments there may be continual scrubbing of the indoor air as it circulates. The time spent regenerating the adsorbent is time when the adsorbent is "off line" and not being utilized. This time spent regenerating may be kept as short as possible.

In accordance with some embodiments of the present disclosure, there is an adsorption-regeneration cycle that is incomplete, limited or interrupted by design. The phases are switched from adsorption to regeneration before the adsorbent is saturated, and the regeneration process may be stopped well before all the pollutants are released. This is done in order to achieve the best economics for indoor air scrubbing.

In some embodiments, the air treatment assembly 102 or scrubber may be configured to cycle between scrubbing at least one pollutant and/or gas from the stream of gases with the pollutant, and regenerating at least some of the adsorbent. The adsorption-regeneration cycle may comprise an adsorption phase which may be followed by a regeneration phase.

A complete adsorption phase may comprise a first time period for substantially saturating the adsorbent during the adsorption phase under the adsorption flow and temperature conditions being used. Similarly, a complete regeneration phase may comprise a second time period for removing substantially all of the removable pollutants and/or first gas from the adsorbent during the regeneration phase, under the purge flow and temperature conditions being used.

In accordance with some embodiments of the present disclosure, the duration of the second time period may be limited to a period of time which is less than the complete regeneration phase. Additionally or alternatively, the duration of the first time period may be limited to a period of time which is less than the complete adsorption phase.

In some embodiments the adsorption-regeneration cycle may comprise an adsorption phase followed by an optional first switchover time period, which may be followed by a regeneration phase. The regeneration phase may be followed by an optional second switchover time period.

In some embodiments, during the first switchover time period the adsorbent may be heated or may be maintained at the same temperature. In some embodiments, during the second switchover time period the adsorbent may be cooled down. The cool down may be facilitated by flowing unheated air through the sorbent during this time.

In accordance with some embodiments, the first switchover time period may comprises a period of time to bring the adsorbent to a temperature to release the pollutant from the adsorbent during the regeneration phase. The second switchover time period may comprise a period of time to bring the adsorbent to a temperature to adsorb the pollutant during the adsorption phase.

In a non-limiting example, the first time period may comprise about 95% of a complete adsorption phase. In some embodiments, the first time period may comprise about 90% of a complete adsorption phase. In some embodiments, the first time period may comprise about 80% of a complete adsorption phase. In some embodiments, the first time period may comprise about 50% of a complete adsorption phase. In some embodiments, the first time period may comprise about 20% of a complete adsorption phase. In some embodiments, the first time period may comprise about 20%-95% of a complete adsorption phase.

In a non-limiting example the second time period may comprise about 95% of a complete regeneration phase. In some embodiments, the second time period may comprise about 90% of a complete regeneration phase. In some embodiments, the second time period may comprise about 80% of a complete regeneration phase. In some embodiments, the second time period may comprise about 50% of a complete regeneration phase. In some embodiments, the second time period may comprise about 20% of a complete regeneration phase. In some embodiments, the second time period may comprise about 20%-95% of a complete regeneration phase.

Determining the duration of the limited period of time for the regeneration phase and/or the adsorption phase may be performed in any suitable manner, such as empirically via experimentation, for example.

In some embodiments, determining the duration of the limited period may be performed by a computer including a processor and a non-transitory machine-readable medium (for example).

In some embodiments, controlling cycling between the adsorption and regeneration phases may be performed by a computer including a processor and a non-transitory machine-readable medium, storing instructions having computer instructions operating thereon (for example).

In some embodiments, optimizing the cycle length and regeneration time may be performed by a system for controlling the air treatment assembly 102 (which may be referred to as the scrubber). The air treatment assembly 102 containing the adsorbent may be configured to cycle between scrubbing the pollutant and/or gas from the stream of gases in the incoming air and/or gas being adsorbed onto the adsorbent, and purging the pollutant and/or first gas from the adsorbent, via the regeneration gas flow. The air treatment assembly 102 may include means for flowing the stream of gases through the air treatment assembly 102 and over and/or through the adsorbent, where the adsorbent adsorbs the pollutant and/or gas from the stream of gases during the adsorption phase over a first time period. The air treatment assembly 102 may include means for flowing the regeneration gas flow over the adsorbent for purging a portion of the pollutant and/or first gas from the adsorbent during a regeneration phase over a second time period with a regeneration gas flow. The air treatment assembly 102 may include means for cycling between the adsorption phase and the regeneration phase, where one cycle may comprise one adsorption phase followed by one regeneration phase. One cycle period may comprise the total time elapsed during a complete cycle or summation of the first time period, and the second time period. A complete regeneration phase may comprise a time period for removing substantially all of the pollutant and/or gas that can be removed from the adsorbent during the regeneration phase. A complete adsorption phase may comprise a time period for substantially saturating all the adsorbent during the adsorption. The duration of at least one of the following may be limited: the first time period to a period of time which is less than the complete adsorption phase and the second time period to a period of time which is less than the complete regeneration phase.

In some embodiments, the means for cycling may comprise a processor and a non-transitory machine-readable medium storing instructions having computer instructions operating thereon for controlling cycling between the adsorption and regeneration phases (for example).

In some embodiments, the means for cycling may comprise a control unit (not shown), such as an automated electromechanical control unit that determines when to open or close the dampers shown in FIG. 3, for example, when to activate fans of FIG. 3, for example, and may be responsible for flowing the incoming air purge gas through the system, for example. The air management system 100 of FIGS. 1A-1C and air management system 200 of FIGS. 2A-2B may also operate with sensors and actuators or any other suitable elements configured for determining when to activate the cycling means.

As described in reference to FIGS. 1A-3, the means for flowing the stream of gases through the scrubber and the means for flowing the regeneration gas flow may comprise any suitable means. For example, the means may comprise dampers, fans, (such as shown in FIG. 3), valves, and/or shutters and ducts, inlets and outlets (such as shown in FIGS. 1A-3) and/or conduits.

In accordance with some embodiments the following analysis may be performed for determining the duration of the limited time period. The analysis is described in reference to a pollutant comprising $CO_2$, but is applicable to any other pollutants.

A general rationale for incomplete regeneration is as follows: If the rate of release of $CO_2$ slows down to a trickle, the adsorbent is nearing its clean state and can already be put to work effectively, so just like there is no reason to let the adsorbent idle, there is no reason to spend too much time regenerating it to the last few percent of capacity. The question is, what is the right time to stop regeneration and to switch back to adsorption.

For a given set of regeneration conditions, the rate of release of $CO_2$ is denoted by R(t), measured in units of mass per time (such as moles per minute, grams per second, etc.), where t denotes the time measured from the beginning of the regeneration cycle. Typically R(t) increases at the beginning of the regeneration cycle as the adsorbent is heated while it is still loaded with $CO_2$ but soon thereafter starts declining over time, as the amount of captured $CO_2$ declines during the regeneration cycle, and thus, R(t) gradually trails off over an extended period.

On the adsorption side there is an analogous situation where A(t) is the rate at which $CO_2$ is removed from the air flow, again measured in units of mass per time, and in analogy to R(t), it generally decreases as a function of time.

The typical cycle would have the adsorption phase continue for a time period of $t_a$ and then have the regeneration phase continue for a period $t_r$. Since the amounts of carbon adsorbed and released have to balance each other in repeated cycles over the long run, it may be that the total amount adsorbed in a single adsorption phase, C, equals the amount released in a single regeneration phase, namely:

$$\int_0^{t_a} A(t)dt = \int_0^{t_r} R(t)dt = C \qquad (1)$$

The length of the entire adsorption-regeneration cycle, T, is given by $$T = t_a + t_r + t_s \qquad (2)$$

where $t_s$ is the optional switchover or pause time between adsorption phase and regeneration phase; for example, time allowed for the adsorbent to cool down or warm up as needed.

Since the amount of $CO_2$ removed from the indoor air in each such cycle is C, the overall system productivity, p—defined as the average amount of $CO_2$ removed per unit time—is simply $$p = C/T \qquad (3)$$

But the value of p depends not only on the adsorbent and the environment in which it operates but also on our choice of $t_a$ and $t_r$.

According to an embodiment, the optimal choice of $t_r$, for any particular set of conditions in terms of temperature, flow rates and $CO_2$ concentrations, may be approximately identified. In plugging equations (2) and (1) into (3) the following is received:

$$p = C/T = \frac{\int_0^{t_r} R(t)dt}{t_a + t_r + t_s} \qquad (4)$$

Through basic calculus, the maximum value for p is obtained by taking its derivative with respect to $t_r$ and equating it to zero, namely $$\frac{dp}{dt_r} = 0 \qquad (5)$$

Which can be expanded using basic derivative rules that state generally $$\frac{d}{dx}\left(\frac{f}{g}\right) = \frac{\left(\frac{df}{dx}g - \frac{dg}{dx}f\right)}{g^2} \qquad (6)$$

So equation (5) requires $$\frac{d}{dt_r}\left(\frac{C}{T}\right) = \frac{\left(\frac{dC}{dt_r}T - \frac{dT}{dt_r}C\right)}{T^2} = 0 \qquad (7)$$

Which implies that $$\frac{dC}{dt_r}T - \frac{dT}{dt_r}C = 0 \qquad (8)$$

Or in other words $$\frac{dC}{dt_r}\bigg/C = \frac{dT}{dt_r}\bigg/T \qquad (9)$$

This condition, although not an immediately solvable equation, is an important insight for the optimal design of indoor air adsorbent scrubbers, such as for single adsorbents or for more than one adsorbent designs. It can be further reduced to practice using the fact that, by definition, $$\frac{dC}{dt_r} = R(t_r) \qquad (10)$$

And assuming $t_s$ is independent of $t_r$, $$\frac{dT}{dt_r} = \left(1 + \frac{dt_a}{dt_r}\right) \qquad (11)$$

The following condition for $t_r$ is received $$R(t_r) = \left(1 + \frac{dt_a}{dt_r}\right) \times p = \beta p \qquad (12)$$

Where a new parameter, $\beta$, is introduced and may be simply defined as $$\beta \equiv 1 + \frac{dt_a}{dt_r} \qquad (13)$$

Admittedly equation (12) is still not an explicit closed form expression that allows calculation of $t_r$, but it is a useful design condition, and it does immediately suggest a lower bound, since $\beta$ is always greater than 1. That means that at a minimum, it may be economically preferable to stop regeneration before the instantaneous rate R(t) drops below p, namely the following condition should be maintained $$R(t_r) \geq p \qquad (14)$$

It is a more reasonable estimate that $$\left(\frac{dt_s}{dt_r}\right) \sim 1 \qquad (15)$$

So it can be better approximated that $\beta \approx 2$, thus having an even earlier threshold for stopping regeneration at $$R(t_r) \sim 2p \qquad (16)$$

Technically it remains an open equation because the value of p is not fixed, but it can be solved by iterations. This is a useful and practical guideline especially since the value of p varies relatively slowly with changes in $t_r$, so a few iterations will quickly converge on a very good approximation.

In some embodiments, empirically a more precise value for $\beta$ can be derived, which would help refine formula (16), this may be performed by measuring the rate of adsorption towards the end of the cycle and comparing it to the rate of desorption. Two extremes are worth elaborating further.

In the case of classical "breakthrough", the adsorption rate dramatically falls at the end of the cycle which means $dt_a \gg dt_r$ and $\beta \gg 1$, which translates into such a high threshold for R that regeneration may be stopped. In other words there may be no point or benefit in extending the regeneration phase if doing so does only causes lingering in adsorption mode post-breakthrough.

When there is only a very gradual decline in A(t) towards the end of the cycle, the opposite holds, namely $dt_a < dt_r$ and β≈1, which means equation (14) is a good design criterion for timing the duration of the regeneration step.

It is noted that the principles described in this disclosure apply to a wide variety of scrubbing applications and $CO_2$ or other pollutants removal applications using adsorbents in an adsorption-release cycle, and are not limited to indoor air applications.

As described above, in some embodiments, the regeneration phase may be terminated upon the regeneration rate $R(t_r)$ of the adsorbent being between about equal to and a predetermined amount less than the productivity p of the complete regeneration phase, where productivity p=C/T, and C equals an amount of the pollutant and/or first gas adsorbed by the adsorbent from the stream of gases during one cycle and T is the duration of one cycle period. This predetermined amount less than the productivity may be any suitable amount. In a non-limiting example, the predetermined amount may be in the range of 20-98% of the productivity p of the complete regeneration phase.

In some embodiments, the regeneration phase is terminated upon a regeneration rate $R(t_r)$ being between about equal to and about twice a productivity p of the complete regeneration phase, where productivity p=C/T, and C equals an amount of the pollutant and/or first gas adsorbed by the adsorbent from the stream of gases during one cycle and T is the duration of one cycle period.

In accordance with some embodiments there is described a method for removing a gas component including at least one adsorbate (which may also be referred to herein as a pollutant(s) and/or a particular gas(s)) from a stream of mixed gases, the method may comprise one or more of: using an adsorbent material in a repeated cyclical fashion, with at least two distinct phases in each cycle, one being an adsorption phase where the adsorbate is partially removed from the streaming gas mixture onto the adsorbent, and one being a regeneration phase where the adsorbate is released from the adsorbent and carried away. The duration of the regeneration phase may be substantially shorter than a complete regeneration phase, the complete regeneration phase being the time to release substantially all of the adsorbate that can be released under the temperature and flow conditions of the system.

In accordance with some embodiments at least an additional 10% of the adsorbate could be released if the regeneration phase were extended by 100%. Alternatively, at least an additional 5% of the adsorbate could be released if the regeneration phase were extended by 100%.

The example set forth herein is meant to exemplify various aspects of the disclosure and is not intended to limit in any way.

EXAMPLE

Figure 4:
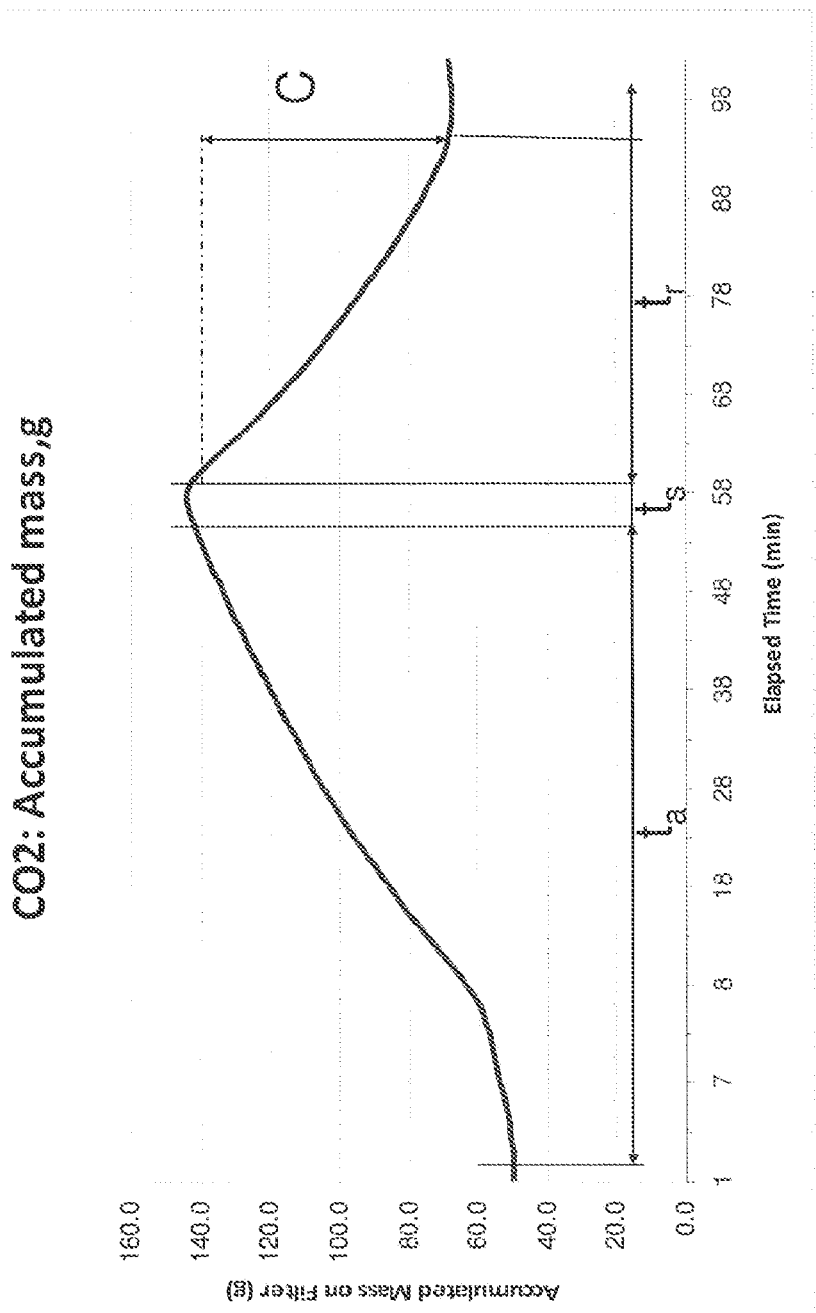
FIG. 4 is a graph showing an adsorption-regeneration cycle according to some embodiments of the present disclosure.

Reference is made to FIG. 4, which is a graph showing a method for calculating the optimal adsorption-regeneration cycle and in accordance with the formulas described hereinabove. As seen in FIG. 4 the values of the following parameters are substantially:

$t_a$=53 min
$t_s$=5 min
$t_r$=34 min
Thus, T is the sum of $t_a+t_s+t_r$=92 min
C=70 grams
Therefore p=C/T=70/92=0.76 [grams per minutes]

Thus, the regeneration may be stopped where $R(t_r)$ according to formula (14) is equal or larger than 0.76 (grams per minutes) or according to formula (16) where $R(t_r)$ is substantially equal to 1.52 (grams per minutes).

In accordance with some embodiments prior to streaming the regeneration air flow in the reverse direction to the incoming air, as described in reference to FIGS. 1A-3, or in the same direction, the following may be determined: the amount of the pollutant in the scrubbed air flow and/or the ability of the adsorbent to capture an additional amount of the pollutant over and above a predetermined amount, and when the amount of the pollutant is greater than a predetermined amount, and/or the adsorbent has captured the predetermined amount of the pollutant, streaming of the regeneration air flow over and/or through the adsorbent is performed.

The amount of the pollutant in the scrubbed air flow and/or the ability of the adsorbent to capture an additional amount of the at least one pollutant may be determined in any suitable manner, such as by a computer including a processor and a non-transitory machine-readable medium (for example).

This predetermined amount of the pollutant may be any suitable amount. In a non-limiting example, the predetermined amount may be an amount of the pollutant that substantially saturates the adsorbent. In a non-limiting example, the predetermined amount may be less than the amount of the pollutant that substantially saturates the adsorbent.

In accordance with some embodiments prior to streaming the regeneration air flow in the reverse direction to the incoming air, as described in reference to FIGS. 1A-3, or in the same direction, the following may be determined: a level of an adsorption efficiency, where the adsorption efficiency at any point in time during the one cycle has a value of $1-C_{in}/C_{out}$. $C_{in}$ is the concentration of the pollutant in the incoming air flow and $C_{out}$ is the concentration of the pollutant in the outgoing air flow. When the adsorption efficiency value is less than an initial adsorption efficiency value, streaming of the regeneration air flow over and/or through the adsorbent is performed. The initial adsorption efficiency value is the adsorption efficiency value at the beginning of the adsorption phase.

The adsorption efficiency value and the initial adsorption efficiency value may be determined in any suitable manner, such as by a computer including a processor and a non-transitory machine-readable medium (for example).

In some embodiments, where the adsorption efficiency value is less than the initial adsorption efficiency value, a regeneration air flow is streamed through the air treatment assembly 102 and over and/or through the adsorbent in a second direction opposite to the first direction of the incoming air, such that the regeneration air flow regenerates at least some of the adsorbent and purges at least some of the pollutants from the adsorbent.

In some embodiments, streaming of the regeneration air flow over and/or through the adsorbent is performed where the adsorption efficiency value is at least about 20% less than the initial adsorption efficiency value. In some embodiments, streaming of the regeneration air flow over and/or through the adsorbent is performed where the adsorption efficiency value is at least about 30% less than the initial adsorption efficiency value. In some embodiments, streaming of the regeneration air flow over and/or through the adsorbent is performed where the adsorption efficiency value is at least about 50% less than the initial adsorption efficiency value. In some embodiments, streaming of the regeneration air flow over and/or through the adsorbent is performed where the adsorption efficiency value is at least about 80% less than the initial adsorption efficiency value.

In is noted that the air treatment assembly 102 described above in reference to FIGS. 1A-4, may be configured to treat any stream of gas, such as air from the enclosed environment 110, flue gases, or nitrogen with elevated levels of carbon dioxide, organic contaminants relative to substantially unpolluted air, or outside air.

Various implementations of some of embodiments disclosed, in particular at least some of the processes discussed (or portions thereof), may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input.

Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure).

What is claimed is:

1. A method for reducing the level of at least one pollutant contained in indoor air from a human-occupied, enclosed environment, the method comprising:
providing an air treatment assembly including at least one type of adsorbent, the adsorbent configured for capturing at least one pollutant entrained in an indoor air flow from the enclosed environment during an adsorption phase and regenerating the adsorbent during a regeneration phase upon exposure to a regenerating gas flow;
cycling between the adsorption phase and the regeneration phase,
wherein:
during the adsorption phase, the method comprises streaming the indoor air flow over and/or through the adsorbent in a first direction such that the adsorbent captures at least some of the at least one pollutant from the indoor air flow, wherein after being flowed over and/or through the adsorbent, the air flow comprises a scrubbed air flow;
during the regeneration phase, the method comprises streaming the regeneration gas flow over and/or through the adsorbent in a second direction opposite to the first direction, such that the regeneration gas flow regenerates at least some of the adsorbent and purges at least some of the at least one pollutant from the adsorbent;
terminating a respective adsorption phase when an adsorption efficiency value is less than or equal to a fraction of an initial adsorption efficiency value of the adsorbent; and terminating a respective regeneration phase when a regeneration rate is within a predetermined range of a productivity of a complete regeneration phase of the adsorbent.

2. The method of claim 1 where there are at least two adsorbents such that the streaming indoor air flows through a first adsorbent and subsequently through a second adsorbent, and that as a result of the reversal of the flow direction during regeneration, substances purged from the first adsorbent do not flow across the second adsorbent.

3. The method of claim 1, wherein:
pollutants which are released from the adsorbent during regeneration accumulate in the air treatment assembly or air conduits attached to it, and as a result of the reversal of the flow direction during regeneration, the released pollutants are substantially prevented from accumulating downstream from the adsorbent and accumulate substantially in sections of the air treatment assembly that are upstream from the adsorbent,
the air treatment assembly comprising an inlet for indoor air flowing through the adsorbent; and
upstream the adsorbent being in greater proximity to the inlet than downstream the adsorbent.

4. The method of claim 1, wherein the pollutant is selected from the group consisting of: carbon dioxide, volatile organic compounds, sulfur oxides, radon, nitrous oxides and carbon monoxide.

5. The method of claim 1, wherein the adsorbent comprises at least one of an amine supported by a solid, activated carbon, clay, carbon fibers, silica, alumina, zeolites, molecular sieves, titanium oxide, polymer, porous polymers, polymer fibers and metal organic framework.

6. The method of claim 5, wherein the supporting solid is at least one of silica, carbon, clay or metal oxide.

7. The method of claim 1, wherein the adsorbent comprises granular solids or pelleted shaped solids.

8. A system for reducing the level of at least one pollutant contained in indoor air from an enclosed, human-occupied environment, the system comprising:
an air treatment assembly including an adsorbent, the adsorbent configured for capturing at least one pollutant entrained in an indoor air flow during an adsorption phase and regenerating the adsorbent during a regeneration phase upon exposure to a regenerating gas flow; and
a controller for cycling between the adsorption phase and the regeneration phase;
streaming means for:
streaming the indoor air flow over and/or through the adsorbent in a first direction during a respective adsorption phase, such that the adsorbent captures at least some of the at least one pollutant from the indoor air flow, and
streaming the regeneration air flow over and/or through the adsorbent in a second direction opposite to the first direction during a respective adsorption phase, such that the regeneration gas flow regenerates at least some of the adsorbent and purges at least some of the at least one pollutant from the adsorbent,
wherein the controller is configured such that:
a respective adsorption phase is terminated when an adsorption efficiency value is less than or equal to a fraction of an initial adsorption efficiency value; and
a respective regeneration phase is terminated when a regeneration rate that is within a predetermined range of a productivity of a complete regeneration phase of the adsorbent.

9. A method for reducing the level of at least one pollutant contained in indoor air from an enclosed, human-occupied environment, the method comprising:
providing an air treatment assembly including an adsorbent, the adsorbent configured for capturing at least one pollutant entrained in an indoor air flow from the enclosed environment and regenerating upon exposure to a regenerating gas flow;
streaming the indoor air flow over and/or through the adsorbent in a first direction such that the adsorbent captures at least some of the at least one pollutant from the indoor air flow, wherein the streaming of the indoor air flow over and/or through the adsorbent comprises an adsorption phase; and
streaming the regeneration gas flow over and/or through the adsorbent in a second direction opposite to the first direction, such that the regeneration air flow regenerates at least some of the adsorbent and purges at least some of the at least one pollutant from the adsorbent, wherein the streaming of the regeneration gas flow over and/or through the adsorbent comprises a regeneration phase,
cycling between the adsorption phase and the regeneration phase, wherein
one cycle comprises an adsorption phase followed by a regeneration phase, one cycle period comprises the total time elapsed during one cycle;
the at least one pollutant purged from the adsorbent is carried away by the regeneration gas flow, and
a complete regeneration phase comprises a first time period for removing substantially all of the at least one pollutant from the adsorbent during the regeneration phase, and
and
a complete adsorption phase comprises a second time period for substantially saturating all the adsorbent during the adsorption; and
limiting at least one of:
the duration of the first time period to a period of time which is less than the complete adsorption phase, and
the duration of the second time period to a period of time which is less than the complete regeneration phase.

10. The method of claim 9, wherein prior to streaming the regeneration gas flow the method further includes determining a level of an adsorption efficiency, wherein the adsorption efficiency at any point in time during the one cycle has a value of $1-C_{in}/C_{out}$, wherein $C_{in}$ is the concentration of the pollutant in the incoming air flow and $C_{out}$ is the concentration of the pollutant in an outgoing air flow, and wherein an initial adsorption efficiency value is the adsorption efficiency value at the beginning of the adsorption phase, wherein when the adsorption efficiency value is less than the initial adsorption efficiency value, streaming of the regeneration gas flow over and/or through the adsorbent is performed.

11. The method of claim 10, wherein the adsorption efficiency value is at least about 20% less than the initial adsorption efficiency value.

12. The method of claim 10, wherein the adsorption efficiency value is at least about 30% less than the initial adsorption efficiency value.

13. The method of claim 10, wherein the adsorption efficiency value is at least about 50% less than the initial adsorption efficiency value.

14. The method of claim 10, wherein the adsorption efficiency value is at least about 80% less than the initial adsorption efficiency value.

\* \* \* \* \*